US011917221B2

(12) United States Patent
Tsuji et al.

(10) Patent No.: US 11,917,221 B2
(45) Date of Patent: *Feb. 27, 2024

(54) ENCODING DEVICE AND METHOD, REPRODUCTION DEVICE AND METHOD, AND PROGRAM

(71) Applicant: Sony Group Corporation, Tokyo (JP)

(72) Inventors: Minoru Tsuji, Chiba (JP); Toru Chinen, Kanagawa (JP); Runyu Shi, Tokyo (JP); Masayuki Nishiguchi, Kanagawa (JP); Yuki Yamamoto, Chiba (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,251

(22) Filed: Apr. 26, 2022

(65) Prior Publication Data

US 2022/0256216 A1   Aug. 11, 2022

Related U.S. Application Data

(63) Continuation of application No. 16/826,675, filed on Mar. 23, 2020, now Pat. No. 11,330,310, which is a
(Continued)

(30) Foreign Application Priority Data

Oct. 10, 2014   (JP) ................. 2014-208594

(51) Int. Cl.
*H04N 21/234*   (2011.01)
*H04N 19/70*   (2014.01)
(Continued)

(52) U.S. Cl.
CPC ... *H04N 21/234363* (2013.01); *H04N 19/156* (2014.11); *H04N 19/157* (2014.11);
(Continued)

(58) Field of Classification Search
CPC ..... H04N 21/234363; H04N 21/23614; H04N 21/435; H04N 21/45455; H04N 21/4728;
(Continued)

(56) References Cited

U.S. PATENT DOCUMENTS 6,714,253 B2   3/2004   Kim et al.
7,420,598 B1   9/2008   Ito
(Continued)

FOREIGN PATENT DOCUMENTS

CN   1402539 A   3/2003
CN   102244807 A   11/2011
(Continued)

OTHER PUBLICATIONS

International Search Report and English translation thereof dated Nov. 10, 2015 in connection with International Application No. PCT/JP2015/077243.
(Continued)

*Primary Examiner* — Dominic D Saltarelli
(74) *Attorney, Agent, or Firm* — Wolf, Greenfield & Sacks, P.C.

(57) ABSTRACT

The present technology relates to an encoding device, an encoding method, a reproduction device, a reproduction method, and a program enabling each reproduction equipment to reproduce an appropriate content in a simplified manner. A content data decoding unit decodes encoded metadata and outputs zoom area information, which is included in metadata acquired as a result thereof, designating an area to be zoomed. A zoom area selecting unit selects one or a plurality of pieces of zoom area information from among the zoom area information. A video segmenting unit segments a zoom area represented by the selected zoom area information in a video based on video data and outputs zoom video data acquired as a result thereof. An audio converting
(Continued)

unit performs an audio converting process according to the selected zoom area information for audio data and outputs zoom audio data acquired as a result thereof. The present technology can be applied to a reproduction device.

9 Claims, 24 Drawing Sheets

Related U.S. Application Data continuation of application No. 15/516,537, filed as application No. PCT/JP2015/077243 on Sep. 28, 2015, now Pat. No. 10,631,025.

(51) Int. Cl.
  H04N 21/43      (2011.01)
  H04N 21/45      (2011.01)
  H04N 21/84      (2011.01)
  H04N 21/47      (2011.01)
  H04N 21/236     (2011.01)
  H04N 19/156     (2014.01)
  H04N 19/157     (2014.01)
  H04N 19/80      (2014.01)
  H04N 19/167     (2014.01)
  H04N 21/2343    (2011.01)
  H04N 21/435     (2011.01)
  H04N 21/4545    (2011.01)
  H04N 21/4728    (2011.01)

(52) U.S. Cl.
  CPC .......... H04N 19/70 (2014.11); H04N 19/80 (2014.11); H04N 21/23614 (2013.01); H04N 21/435 (2013.01); H04N 21/45455 (2013.01); H04N 21/4728 (2013.01); H04N 21/84 (2013.01); H04N 19/167 (2014.11); H04N 21/236 (2013.01)

(58) Field of Classification Search
  CPC .... H04N 21/84; H04N 21/236; H04N 19/156; H04N 19/157; H04N 19/70; H04N 19/80; H04N 19/167
  USPC ......................................................... 725/116
  See application file for complete search history.

(56) References Cited

U.S. PATENT DOCUMENTS

| | | | |
|---|---|---|---|
| 7,646,437 B1 | 1/2010 | Dumitras et al. | |
| 8,358,363 B2 | 1/2013 | Arai | |
| 8,693,846 B2 | 4/2014 | Prestenback et al. | |
| 8,823,667 B1 | 9/2014 | Hill | |
| 8,826,145 B1 | 9/2014 | Kirkpatrick et al. | |
| 9,071,830 B2 | 6/2015 | Okada et al. | |
| 9,078,014 B2 | 7/2015 | Hendricks et al. | |
| 9,131,098 B2 | 9/2015 | Jang et al. | |
| 9,165,203 B2 | 10/2015 | McCarthy | |
| 9,185,268 B2 | 11/2015 | Doser et al. | |
| 9,235,917 B2 | 1/2016 | Puri et al. | |
| 9,329,827 B2 | 5/2016 | Lavine et al. | |
| 9,491,319 B2 | 11/2016 | Yokoyama et al. | |
| 9,508,172 B1 | 11/2016 | Hume et al. | |
| 9,607,658 B2 | 3/2017 | Atkins et al. | |
| 9,626,084 B2 | 4/2017 | Waggoner et al. | |
| 9,654,751 B2 | 5/2017 | Doser et al. | |
| 9,684,716 B2 | 6/2017 | McConville et al. | |
| 9,870,801 B2 | 1/2018 | Puri et al. | |
| 9,894,422 B2 | 2/2018 | Hwang et al. | |
| 9,922,007 B1 | 3/2018 | Jain et al. | |
| 10,057,591 B2 | 8/2018 | Yuan et al. | |
| 10,192,563 B2 | 1/2019 | Fueg et al. | |
| 10,200,721 B2 | 2/2019 | Denoual et al. | |
| 10,210,907 B2 | 2/2019 | Puri et al. | |
| 10,397,666 B2 | 8/2019 | Thomas et al. | |
| 10,582,221 B2 | 3/2020 | Denoual et al. | |
| 10,587,977 B2 | 3/2020 | Neukam et al. | |
| 10,595,062 B2 | 3/2020 | Maze et al. | |
| 10,631,025 B2 | 4/2020 | Tsuji et al. | |
| 10,742,999 B2 | 8/2020 | Wang et al. | |
| 10,805,614 B2 | 10/2020 | D'Acunto et al. | |
| 10,841,566 B2 | 11/2020 | He et al. | |
| 11,006,181 B2 | 5/2021 | Murtaza et al. | |
| 2002/0157112 A1 | 10/2002 | Kuhn | |
| 2004/0117735 A1 | 6/2004 | Breen | |
| 2004/0212731 A1 | 10/2004 | Sie et al. | |
| 2005/0093981 A1* | 5/2005 | Nonaka | H04N 21/2343 375/E7.181 |
| 2005/0195205 A1 | 9/2005 | Abrams | |
| 2006/0061602 A1* | 3/2006 | Schmouker | H04N 21/4858 348/E5.103 |
| 2006/0224448 A1 | 10/2006 | Herf | |
| 2007/0269187 A1 | 11/2007 | Morimoto et al. | |
| 2009/0086042 A1 | 4/2009 | Vartiainen et al. | |
| 2009/0089448 A1 | 4/2009 | Sze et al. | |
| 2009/0115901 A1 | 5/2009 | Winter et al. | |
| 2009/0251594 A1 | 10/2009 | Hua et al. | |
| 2010/0110108 A1 | 5/2010 | Alexandersson et al. | |
| 2010/0158099 A1 | 6/2010 | Kalva et al. | |
| 2011/0007131 A1 | 1/2011 | Okada et al. | |
| 2011/0099494 A1 | 4/2011 | Yan et al. | |
| 2011/0289410 A1 | 11/2011 | Paczkowski et al. | |
| 2011/0299832 A1 | 12/2011 | Butcher | |
| 2011/0311207 A1 | 12/2011 | Urabe et al. | |
| 2012/0038675 A1 | 2/2012 | Johnson et al. | |
| 2012/0079578 A1 | 3/2012 | Dachiraju et al. | |
| 2012/0191876 A1 | 7/2012 | Johnson et al. | |
| 2012/0210230 A1 | 8/2012 | Matsuda et al. | |
| 2012/0230512 A1 | 9/2012 | Ojanpera | |
| 2013/0007818 A1 | 1/2013 | Kalidindi et al. | |
| 2013/0097634 A1 | 4/2013 | Jin et al. | |
| 2013/0326343 A1 | 12/2013 | Phillips et al. | |
| 2014/0086338 A1 | 3/2014 | Lu et al. | |
| 2014/0185690 A1 | 7/2014 | Wang et al. | |
| 2014/0196095 A1 | 7/2014 | Kang | |
| 2014/0219636 A1 | 8/2014 | Shah | |
| 2014/0280698 A1 | 9/2014 | Lahti et al. | |
| 2015/0074232 A1 | 3/2015 | Phillips et al. | |
| 2015/0095804 A1 | 4/2015 | Grossman et al. | |
| 2015/0131969 A1 | 5/2015 | Taraki et al. | |
| 2015/0201198 A1 | 7/2015 | Marlatt et al. | |
| 2015/0201225 A1 | 7/2015 | Yin | |
| 2015/0205457 A1 | 7/2015 | Woo et al. | |
| 2015/0208070 A1* | 7/2015 | Verzijp | H04N 19/172 375/240.02 |
| 2015/0256861 A1 | 9/2015 | Oyman | |
| 2015/0296232 A1 | 10/2015 | Hwang et al. | |
| 2015/0304693 A1 | 10/2015 | Hwang et al. | |
| 2015/0309669 A1 | 10/2015 | Wheeler et al. | |
| 2015/0309703 A1 | 10/2015 | Robertson et al. | |
| 2015/0373341 A1* | 12/2015 | Davies | H04N 19/119 375/240.02 |
| 2016/0057509 A1 | 2/2016 | Yamagishi et al. | |
| 2016/0088319 A1 | 3/2016 | Zucchetta | |
| 2016/0165309 A1* | 6/2016 | Van Brandenburg | H04N 21/64322 725/116 |
| 2016/0227228 A1 | 8/2016 | Pomeroy et al. | |
| 2016/0227285 A1* | 8/2016 | Voss | G06F 3/04845 |
| 2016/0337706 A1 | 11/2016 | Hwang et al. | |
| 2017/0011751 A1 | 1/2017 | Fueg et al. | |
| 2017/0127127 A1 | 5/2017 | Zavesky et al. | |
| 2017/0230546 A1 | 8/2017 | Lebrun et al. | |
| 2017/0257679 A1 | 9/2017 | Lopez Zapico | |
| 2017/0353704 A1 | 12/2017 | Su et al. | |
| 2018/0007407 A1 | 1/2018 | Maze et al. | |
| 2018/0220204 A1 | 8/2018 | Yamagishi et al. | |
| 2018/0241925 A1 | 8/2018 | Suzuki et al. | |
| 2018/0242030 A1 | 8/2018 | Tsuji et al. | |
| 2019/0110081 A1 | 4/2019 | Denoual et al. | |
| 2019/0139562 A1 | 5/2019 | Fueg et al. | |

(56) References Cited

U.S. PATENT DOCUMENTS

| | | | |
|---|---|---|---|
| 2019/0147914 A1 | 5/2019 | Puri et al. |
| 2019/0158935 A1 | 5/2019 | Denoual et al. |
| 2019/0320189 A1 | 10/2019 | Cooper et al. |
| 2020/0126582 A1 | 4/2020 | Yamamoto et al. |
| 2020/0137506 A1 | 4/2020 | Lee et al. |
| 2020/0221146 A1 | 7/2020 | Tsuji et al. |
| 2020/0228844 A1 | 7/2020 | Denoual et al. |
| 2020/0245032 A1 | 7/2020 | Murtaza et al. |

FOREIGN PATENT DOCUMENTS

| | | | |
|---|---|---|---|
| CN | 102685597 A | 9/2012 |
| EP | 1 814 360 A2 | 8/2007 |
| JP | 2002-171529 A | 6/2002 |
| JP | 2008-199370 A | 8/2008 |
| JP | 2010-232814 A | 10/2010 |
| JP | 2012-004835 A | 1/2012 |
| JP | 2012-060575 A | 3/2012 |
| WO | WO 2011/064438 A1 | 6/2011 |
| WO | WO-2014036085 A1 | 3/2014 |

OTHER PUBLICATIONS

Written Opinion and English translation thereof dated Nov. 10, 2015 in connection with International Application No. PCT/JP2015/077243.

International Preliminary Report on Patentability and English translation thereof dated Apr. 20, 2017 in connection with International Application No. PCT/JP/2015/077243.

Extended European Search Report dated Mar. 23, 2018 in connection with European Application No. 15849654.7.

Communication pursuant to Article 94(3) dated Feb. 4, 2019 in connection with European Application No. 15849654.7.

Japanese Office Action dated Apr. 2, 2019 in connection with Japanese Application No. 2016-553047 and English translation thereof.

Chinese Office Action dated Jun. 28, 2019 in connection with Chinese Application No. 201580053817.8 and English translation thereof.

Japanese Office Action dated Oct. 13, 2020 in connection with Japanese Application No. 2019-142166 and English translation thereof.

[No Author Listed], Sony Global—Digital Imaging—FDR-AX100, Sony Corporation, 2014, 7 Pages. http://www.sony.net/Products/di/en-us/products/j4it/index.html accessed [Oct. 7, 2014 14:33:59].

Oldfield et al., Demo paper: Audio object extraction for live sports broadcast. 2013 IEEE International Conference on Multimedia and Expo Workshops (ICMEW) Jul. 15, 2013: 1-2.

Shi et al., Screen-Related Object Remapping for Zooming, Coding of Moving Pictures and Audio, ISO/IEC JTC1/SC29/WG11, M34253, Jul. 2014, 12 pages.

Extended European Search Report dated Apr. 30, 2021 in connection with European Application No. 20215659.2.

Communication pursuant to Article 94(3) EPC dated Jul. 29, 2022 in connection with European Application No. 20215659.2.

* cited by examiner

| Syntax | Num. of bits |
|---|---|
| hasZoomAreaInfo://0, 1 | 1 |

FIG. 5

| Syntax | Num. of bits |
|---|---|
| If (hasZoomAreaInfo) { | |
|     ZoomAreaX0://0〜7679 | 13 |
|     ZoomAreaY0://0〜4319 | 13 |
|     ZoomAreaX1://0〜7679 | 13 |
|     ZoomAreaY1://0〜4319 | 13 |
| } | |

FIG. 6

| Syntax | Num. of bits |
|---|---|
| If (hasZoomAreaInfo) { | |
|     ZoomAreaXC://0〜7679 | 13 |
|     ZoomAreaYC://0〜4319 | 13 |
|     ZoomAreaXW://0〜7679 | 13 |
|     ZoomAreaYW://0〜4319 | 13 |
| } | |

FIG. 7

| Syntax | Num. of bits |
|---|---|
| If (hasZoomAreaInfo) { | |
|     nbits: | 4 |
|     ZoomAreaXCshift://-7679〜+7679 | nbits |
|     ZoomAreaYCshift://-4319〜+4319 | nbits |
| } | |

FIG. 8

| Syntax | Num. of bits |
|---|---|
| If(hasZoomAreaInfo) { | |
| nbits: | 4 |
| ZoomAreaXWshift://-7679 ~ +7679 | nbits |
| ZoomAreaYWshift://-4319 ~ +4319 | nbits |
| } | |

FIG. 9

| Syntax | Num. of bits |
|---|---|
| If(hasZoomAreaInfo) { | |
| nbits: | 4 |
| ZoomAreaXCshift://-7679 ~ +7679 | nbits |
| ZoomAreaYCshift://-4319 ~ +4319 | nbits |
| ZoomAreaXWshift://-7679 ~ +7679 | nbits |
| ZoomAreaYWshift://-4319 ~ +4319 | nbits |
| } | |

FIG. 10

| Syntax | Num. of bits |
|---|---|
| If(hasZoomAreaInfo) { | |
|   mode://0, 1, 2, 3 | 2 |
|   switch(mode) { | |
|   case 0: | |
|     ZoomAreaXC://0～7679 | 13 |
|     ZoomAreaYC://0～4319 | 13 |
|     ZoomAreaXW://0～7679 | 13 |
|     ZoomAreaYW://0～4319 | 13 |
|     break; | |
|   case 1: | |
|     nbits: | 4 |
|     ZoomAreaXCshift://-7679～+7679 | nbits |
|     ZoomAreaYCshift://-4319～+4319 | nbits |
|     break; | |
|   case 2: | |
|     nbits; | 4 |
|     ZoomAreaXWshift://-7679～+7679 | nbits |
|     ZoomAreaYWshift://-4319～+4319 | nbits |
|     break; | |
|   case 3: | |
|     nbits; | 4 |
|     ZoomAreaXCshift://-7679～+7679 | nbits |
|     ZoomAreaYCshift://-4319～+4319 | nbits |
|     ZoomAreaXWshift://-7679～+7679 | nbits |
|     ZoomAreaYWshift://-4319～+4319 | nbits |
|     break; | |
|   } | |
| } | |

FIG. 13

| Syntax | Num. of bits |
|---|---|
| If(hasZoomAreaInfo) { | |
|   mode://0, 1, 2, 3 | 2 |
|   switch(mode) { | |
|   case 0: | |
|     ZoomAreaAZC://-55～+55 | 7 |
|     ZoomAreaELC://-27～+27 | 6 |
|     ZoomAreaAZW://0～110 | 7 |
|     ZoomAreaELW://0～54 | 6 |
|     break; | |
|   case 1: | |
|     nbits://1～7 | 3 |
|     ZoomAreaAZCshift://-55～+55 | nbits |
|     ZoomAreaELCshift://-27～+27 | nbits |
|     break; | |
|   case 2: | |
|     nbits://1～7 | 3 |
|     ZoomAreaAZWshift://0～110 | nbits |
|     ZoomAreaELWshift://0～54 | nbits |
|     break; | |
|   case 3: | |
|     nbits; | 3 |
|     ZoomAreaAZCshift://-55～+55 | nbits |
|     ZoomAreaELCshift://-27～+27 | nbits |
|     ZoomAreaAZWshift://0～110 | nbits |
|     ZoomAreaELWshift://0～54 | nbits |
|     break; | |
|   } | |
| } | |

FIG. 14

| Syntax | Num. of bits |
|---|---|
| hasZoomAreaInfo; | 1 |
| If(hasZoomAreaInfo) { | |
|    numZoomAreas;//0〜15 | 4 |
| } | |

*FIG. 15*

| Syntax | Num. of bits |
|---|---|
| If(hasZoomAreaInfo) { | |
|   for(idx=0;idx<numZoomAreas+1;idx++) { | |
|     mode[idx]; | 2 |
|     switch(mode) { | |
|     case 0: | |
|       ZoomAreaXC[idx]; | 13 |
|       ZoomAreaYC[idx]; | 13 |
|       ZoomAreaXW[idx]; | 13 |
|       ZoomAreaYW[idx]; | 13 |
|       break; | |
|     case 1: | |
|       nbits; | 4 |
|       ZoomAreaXCshift[idx]; | nbits |
|       ZoomAreaYCshift[idx]; | nbits |
|       break; | |
|     case 2: | |
|       nbits; | 4 |
|       ZoomAreaXWshift[idx];//-7679~+7679 | nbits |
|       ZoomAreaYWshift[idx];//-4319~+4319 | nbits |
|       break; | |
|     case 3: | |
|       nbits; | 4 |
|       ZoomAreaXCshift[idx];//-7679~+7679 | nbits |
|       ZoomAreaYCshift[idx];//-4319~+4319 | nbits |
|       ZoomAreaXWshift[idx];//-7679~+7679 | nbits |
|       ZoomAreaYWshift[idx];//-4319~+4319 | nbits |
|       break; | |
|     } | |
|   } | |
| } | |

FIG. 16

| Syntax | Num. of bits |
|---|---|
| hasZoomAreaInfo; | 1 |
| If(hasZoomAreaInfo) { | |
|   numZoomAreas;//0~15 | 4 |
|   for(idx=0;idx<numZoomAreas+1;idx++) { | 1 |
|   hasExtZoomAreaInfo[idx];//0,1 | |
|   if(hasExtZoomAreaInfo[idx]) { | |
|     ZoomAreaSpecifiedID[idx];//0~15 | 4 |
|     hasZoomAreaCommentary; | 1 |
|     if(hasZoomAreaCommentary) { | |
|       nbytes; | 8 |
|       ZoomAreaCommentary[idx]; | nbytes*8 |
|     } | |
|   } | |
|   } | |
|  } | |
| } | |

FIG. 17

| ZoomAreaSpecifiedID | Specification |
|---|---|
| 0 | Undefined |
| 1 | PROJECTOR |
| 2 | TV RECEIVER (OVER 50 TYPE) |
| 3 | TV RECEIVER (30 TO 50 TYPE) |
| 4 | TV RECEIVER (LESS THAN 30 TYPE) |
| 5 | TABLET PC (HORIZONTAL) |
| 6 | TABLET PC (VERTICAL) |
| 7 | SMARTPHONE (VERTICAL) |
| 8 | SMARTPHONE (HORIZONTAL) |
| 9 | Side View #1 |
| 10 | Side View #2 |
| 11 | Side View #3 |
| 12 | Side View #4 |
| 13 | Side View #5 |
| 14 | Side View #6 |
| 15 | Size View #7 |

ENCODING DEVICE AND METHOD, REPRODUCTION DEVICE AND METHOD, AND PROGRAM

CROSS-REFERENCE TO RELATED APPLICATIONS

This application is a continuation of and claims the benefit under 35 U.S.C. § 120 of U.S. patent application Ser. No. 16/826,675, titled "ENCODING DEVICE AND METHOD, REPRODUCTION DEVICE AND METHOD, AND PROGRAM," filed Mar. 23, 2020, now U.S. Pat. No. 11,330,310, which claims the benefit under 35 U.S.C. § 120 of U.S. patent application Ser. No. 15/516,537, titled "ENCODING DEVICE AND METHOD, REPRODUCTION DEVICE AND METHOD, AND PROGRAM," filed Apr. 3, 2017, now U.S. Pat. No. 10,631,025, which is a National Stage of International Application No. PCT/JP2015/077243, filed in the Japanese Patent Office as a Receiving office on Sep. 28, 2015, which claims priority to Japanese Patent Application Number 2014-208594, filed in the Japanese Patent Office on Oct. 10, 2014, each of which is hereby incorporated by reference in its entirety.

TECHNICAL FIELD

The present technology relates to an encoding device, an encoding method, a reproduction device, a reproduction method, and a program, and more particularly, to an encoding device, an encoding method, a reproduction device, a reproduction method, and a program enabling each reproduction equipment to reproduce an appropriate content in a simplified manner.

BACKGROUND ART

In recent years, video contents of high resolution called 4K or 8K have been known. Such video contents of 4K or 8K are frequently produced in consideration of a large viewing angle, in other words, reproduction on a large screen.

In addition, since video contents of 4K or 8K have high resolution, the resolution is sufficient also in a case where a part of the screen of such video contents is trimmed, and accordingly, such video contents may be trimmed and reproduced (for example, see Non-Patent Document 1).

CITATION LIST

Non-Patent Document

Non-Patent Document 1: FDR-AX100, [online], [searched on Sep. 24, 2014], Internet <URL: www.sony.net/Products/di/en-us/products/j4it/index.html>

SUMMARY OF THE INVENTION

Problems to be Solved by the Invention

Meanwhile, video reproduction equipment is diversified, and reproduction at various screen sizes from a large screen to a smartphone (a multi-function mobile phone) is considered. However, in the present situation, a same content is reproduced with being enlarged or reduced so as to match each screen size.

Meanwhile, video contents of 4K or 8K, as described above, are frequently produced in consideration of reproduction on a large screen. For this reason, it is not appropriate to reproduce such video contents using reproduction equipment such as a tablet personal computer (PC) or a smartphone having a relatively small screen.

Accordingly, for example, for reproduction equipment having mutually-different screen sizes and the like, in order to provide contents appropriate for each screen size, the shape of the screen, and the like, it is necessary to separately prepare a content that is appropriate for each screen size, the shape of the screen, and the like.

The present technology is in consideration of such situations and enables each of reproduction equipment to reproduce an appropriate content in a simplified manner.

Solutions to Problems

A reproduction device according to a first aspect of the present technology includes: a decoding unit that decodes encoded video data or encoded audio data; a zoom area selecting unit that selects one or a plurality of pieces of zoom area information from among a plurality of pieces of zoom area information designating areas to be zoomed; and a data processing unit that performs a trimming process for the video data acquired through decoding or an audio converting process for the audio data acquired through decoding on the basis of the selected zoom area information.

In the plurality of pieces of zoom area information, the zoom area information designating the area for each type of reproduction target equipment may be included.

In the plurality of pieces of zoom area information, the zoom area information designating the area for each rotation direction of reproduction target equipment may be included.

In the plurality of pieces of zoom area information, the zoom area information designating the area for each specific video object may be included.

The zoom area selecting unit may be caused to select the zoom area information in accordance with user's operation input.

The zoom area selecting unit may be caused to select the zoom area information on the basis of information relating to the reproduction device.

The zoom area selecting unit may be caused to select the zoom area information by using at least any one of information representing a type of the reproduction device and information representing a rotation direction of the reproduction device as the information relating to the reproduction device.

A reproduction method or a program according to the first aspect of the present technology includes steps of: decoding encoded video data or encoded audio data; selecting one or a plurality of pieces of zoom area information from among a plurality of pieces of zoom area information designating areas to be zoomed; and performing a trimming process for the video data acquired through decoding or an audio converting process for the audio data acquired through decoding on the basis of the selected zoom area information.

According to the first aspect of the present technology, encoded video data or encoded audio data is decoded, one or a plurality of pieces of zoom area information is selected from among a plurality of pieces of zoom area information designating areas to be zoomed, and a trimming process for the video data acquired through decoding or an audio converting process for the audio data acquired through decoding is performed on the basis of the selected zoom area information.

An encoding device according to a second aspect of the present technology includes: an encoding unit that encodes video data or encodes audio data; and a multiplexer that generates a bit stream by multiplexing the encoded video data or the encoded audio data and a plurality of pieces of zoom area information designating areas to be zoomed.

An encoding method or a program according to the second aspect of the present technology includes steps of: encoding video data or encoding audio data; and generating a bit stream by multiplexing the encoded video data or the encoded audio data and a plurality of pieces of zoom area information designating areas to be zoomed.

According to the second aspect of the present technology, video data is encoded, or audio data is encoded, and a bit stream is generated by multiplexing the encoded video data or the encoded audio data and a plurality of pieces of zoom area information designating areas to be zoomed.

Effects of the Invention

According to first and second aspects of the present technology, each of reproduction equipment can reproduce an appropriate content in a simplified manner.

Note that the effect of the present technology is not limited to effects described here but may be any effect described in the present disclosure.

BRIEF DESCRIPTION OF DRAWINGS

FIG. 5 is a diagram that illustrates the syntax of zoom area information.
FIG. 6 is a diagram that illustrates the syntax of zoom area information.
FIG. 7 is a diagram that illustrates the syntax of zoom area information.
FIG. 8 is a diagram that illustrates the syntax of zoom area information.
FIG. 9 is a diagram that illustrates the syntax of zoom area information.
FIG. 10 is a diagram that illustrates the syntax of zoom area information.
FIG. 13 is a diagram that illustrates the syntax of zoom area information.
FIG. 14 is a diagram that illustrates the syntax of zoom area information presence flag and the like.
FIG. 15 is a diagram that illustrates the syntax of zoom area information.
FIG. 16 is a diagram that illustrates the syntax of zoom area auxiliary information and the like.
FIG. 17 is a diagram that illustrates a zoom specification.

MODE FOR CARRYING OUT THE INVENTION

Hereinafter, embodiments to which the present technology is applied will be described with reference to the drawings.

First Embodiment

<Example of Configuration of Encoding Device>

The present technology enables reproduction equipment such as a TV receiver and a smartphone having mutually-different sizes of display screens to reproduce appropriate contents such as contents appropriate for such reproduction equipment in a simplified manner. A content described here, for example, may be a content formed by a video and an audio or a content formed by any one of a video and an audio. Hereinafter, the description will be continued using an example of a case where a content is formed by a video and an audio accompanying the video.

Figure 1:
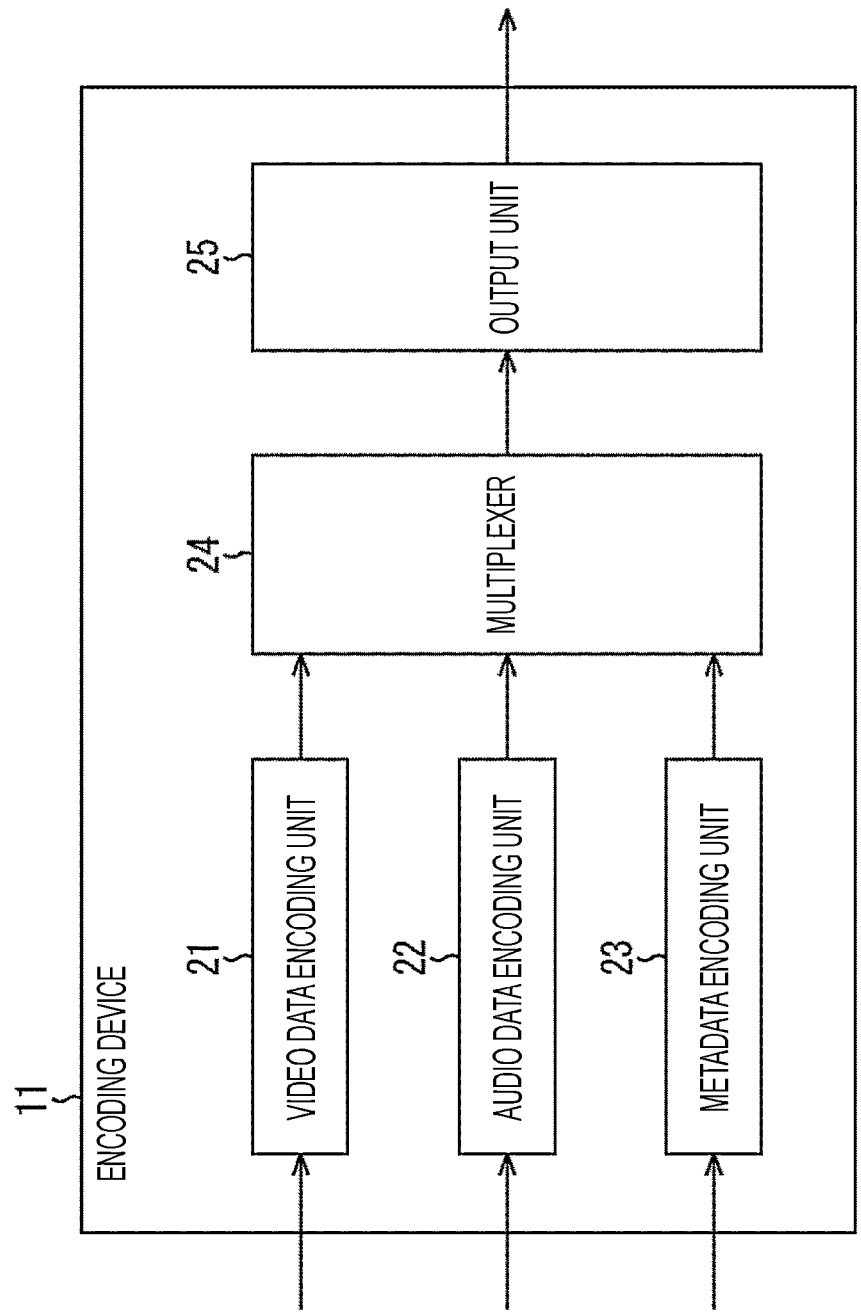
FIG. 1 is a diagram that illustrates an example of the configuration of an encoding device.

FIG. 1 is a diagram that illustrates an example of the configuration of an encoding device according to the present technology.

This encoding device 11 encodes a content produced by a content producer and outputs a bit stream (code string) in which encoded data acquired as a result thereof is stored.

The encoding device 11 includes: a video data encoding unit 21; an audio data encoding unit 22; a metadata encoding unit 23; a multiplexer 24; and an output unit 25.

In this example, video data of a video and audio data of an audio configuring a content are respectively supplied to the video data encoding unit 21 and the audio data encoding unit 22, and metadata of the content is supplied to the metadata encoding unit 23.

The video data encoding unit 21 encodes video data of a supplied content and supplies encoded video data acquired as a result thereof to the multiplexer 24. The audio data encoding unit 22 encodes audio data of a supplied content and supplies encoded audio data acquired as a result thereof to the multiplexer 24.

The metadata encoding unit 23 encodes metadata of a supplied content and supplies encoded metadata acquired as a result thereof to the multiplexer 24.

The multiplexer 24 generates a bit stream by multiplexing encoded video data supplied from the video data encoding unit 21, encoded audio data supplied from the audio data encoding unit 22, and encoded metadata supplied from the metadata encoding unit 23 and supplies the generated bit stream to the output unit 25. The output unit 25 outputs a bit stream supplied from the multiplexer 24 to reproduction equipment or the like.

Note that, hereinafter, a bit stream output from the output unit 25 will be also referred to as encoded content data.

<Encoded Content Data>

A content encoded by the encoding device 11 is produced in consideration of being trimmed and reproduced as is necessary. In other words, a content producer produces contents in consideration of directly reproducing the content or trimming and reproducing a part of the whole area of a video configuring the content.

For example, a content producer selects a partial area to be trimmed and reproduced from the whole area of a video (image) configuring a content, in other words, an area that is zoomed and reproduced through trimming as a zoom area.

Note that the zoom area, for example, for the purpose of realizing a viewing angle that is appropriate for considered reproduction equipment or the like, may be freely determined by a content producer. Furthermore, the zoom area may be determined on the basis of the purpose of zoom such as zooming-in and tracing a specific object such as a vocalist or a player inside a video of a content or the like.

In this way, in a case where several zoom areas are designated for a content by a producer side, in a bit stream output from the encoding device 11, in other words, in encoded content data, zoom area information designating the zoom areas is stored as metadata. At this time, when a zoom area is desired to be designated for every predetermined time unit, zoom area information may be stored in the encoded content data for every time unit described above.

Figure 2:
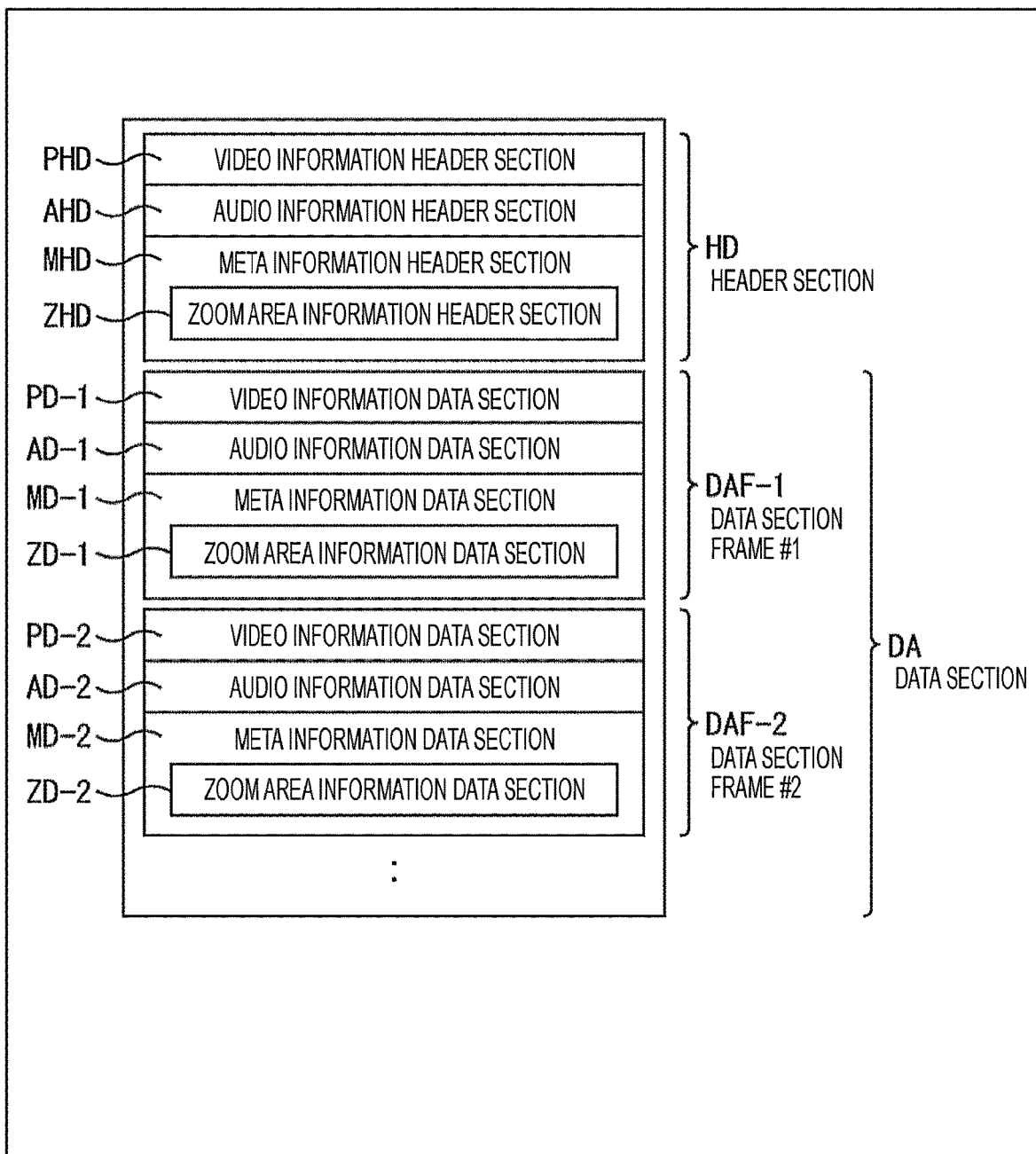
FIG. 2 is a diagram that illustrates the configuration of encoded content data.

More specifically, for example, as illustrated in FIG. 2, in a case where a content is stored in a bit stream for each frame, zoom area information may be stored in the bit stream for each frame.

In the example illustrated in FIG. 2, at the start of a bit stream, in other words, encoded content data, a header section HD in which header information and the like are stored is arranged, and, following the header section HD, a data section DA in which encoded video data and encoded audio data are stored is arranged.

In the header section HD, a video information header section PHD in which header information relating to a video configuring the content is stored, an audio information header section AHD in which header information relating to an audio configuring the content is stored, and a meta information header section MHD in which header information relating to metadata of the content is stored are disposed.

Further, in the meta information header section MHD, a zoom area information header section ZHD in which information relating to zoom area information is stored is disposed. For example, in the zoom area information header section ZHD, a zoom area information presence flag representing whether or not zoom area information is stored in the data section DA and the like are stored.

In addition, in the data section DA, a data section in which data of an encoded content is stored for each frame of the content is disposed. In this example, at the start of the data section DA, a data section DAF-1 in which data of a first frame is stored is disposed, and, following the data section DAF-1, a data section DAF-2 in which data of a second frame of the content is stored is disposed. In addition, here, data sections of a third frame and subsequent frames are not illustrated in the drawing. Hereinafter, in a case where the data section DAF-1 or the data section DAF-2 of each frame do not need to be particularly discriminated from each other, each thereof will be simply referred to as a data section DAF.

In the data section DAF-1 of the first frame, a video information data section PD-1 in which encoded video data is stored, an audio information data section AD-1 in which encoded audio data is stored, and a meta information data section MD-1 in which encoded metadata is stored are disposed.

For example, in the meta information data section MD-1, positional information and the like of a video object and a sound source object included in the first frame of the content are included. In addition, within the meta information data section MD-1, a zoom area information data section ZD-1 in which encoded zoom area information among the encoded metadata is stored is disposed. The positional information of the video object and the sound source object, the zoom area information, and the like are set as metadata of the content.

Also in the data section DAF-2, similar to the data section DAF-1, a video information data section PD-2 in which encoded video data is stored, an audio information data section AD-2 in which encoded audio data is stored, and a meta information data section MD-2 in which encoded metadata is stored are disposed. In addition, within the meta information data section MD-2, a zoom area information data section ZD-2 in which encoded zoom area information is stored is disposed.

In addition, hereinafter, in a case where the video information data section PD-1 and the video information data section PD-2 do not need to be particularly discriminated from each other, each thereof will be simply referred to also as a video information data section PD, and, in a case where the audio information data section AD-1 and the audio information data section AD-2 do not need to be particularly discriminated from each other, each thereof will be simply referred to also as an audio information data section AD. In addition, in a case where the meta information data section MD-1 and the meta information data section MD-2 do not need to be particularly discriminated from each other, each thereof will be simply referred to also as a meta information data section MD, and, in a case where the zoom area information data section ZD-1 and the zoom area information data section ZD-2 do not need to be particularly discriminated from each other, each thereof will be simply referred to also as a zoom area information data section ZD.

Furthermore, in the case of FIG. 2, in each data section DAF, an example has been described in which the video information data section PD, the audio information data section AD, and the meta information data section MD are disposed. However, the meta information data section MD may be disposed in each of the video information data section PD and the audio information data section AD or in one thereof. In such a case, the zoom area information is stored in the zoom area information data section ZD of the meta information data section MD disposed within the video information data section PD or the audio information data section AD.

Similarly, while an example has been described in which the video information header section PHD, the audio information header section AHD, and the meta information header section MHD are disposed in the header section HD, the meta information header section MHD may be disposed in both or any one of the video information header section PHD and the audio information header section AHD.

In addition, in a case where zoom area information is the same in each frame of a content, the zoom area information may be configured to be stored in the header section HD. In such a case, the zoom area information data section ZD does not need to be disposed in each data section DAF.

Specific Example 1 of Zoom Area Information

Subsequently, a more specific example of the zoom area information will be described.

The zoom area information described above is information designating a zoom area that is an area to be zoomed and more specifically, the zoom area information is information representing the position of the zoom area. The zoom area, for example, as illustrated in FIG. 3, can be specified using the coordinates of a center position, the coordinates of a start point, the coordinates of an end point, a vertical width, a horizontal width, and the like of the zoom area.

Figures 3, 4:
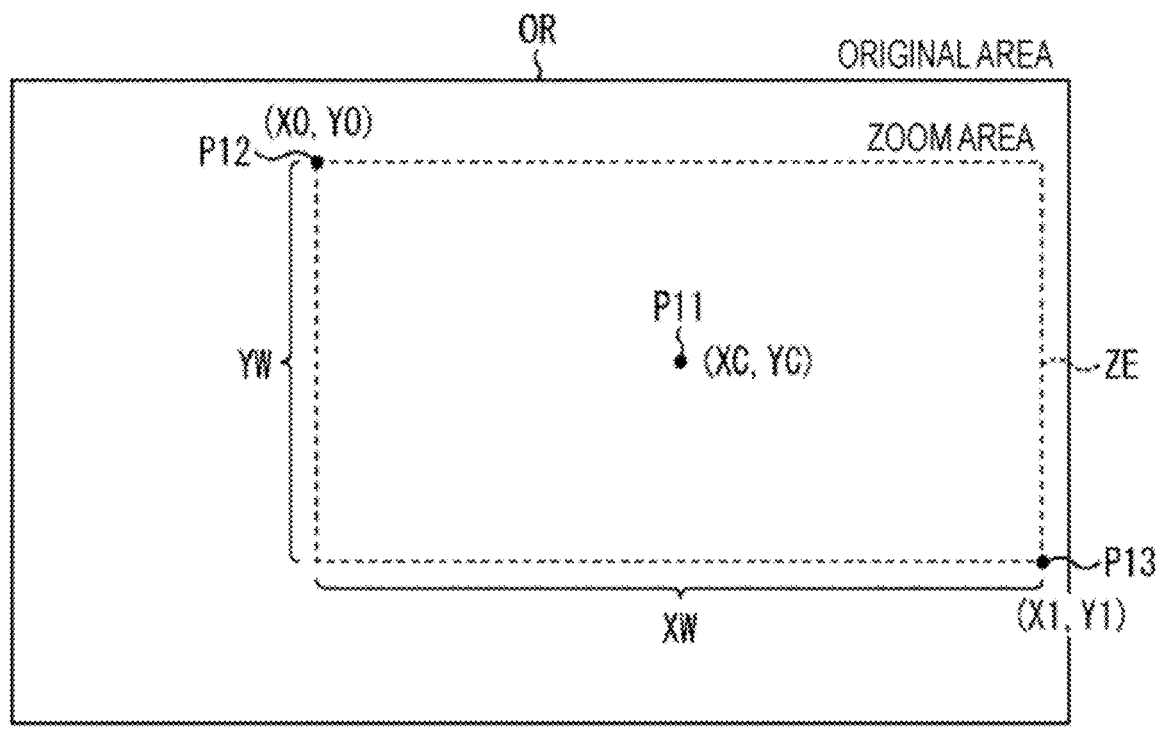
FIG. 3 is a diagram that illustrates zoom area information.
FIG. 4 is a diagram that illustrates the syntax of a zoom area information presence flag.

In the case illustrated in FIG. 3, the area of the whole video (image) of a content is an original area OR, and one rectangular zoom area ZE is designated within the original area OR. In this example, the width of the zoom area ZE in the lateral direction (the horizontal direction) of the drawing is a horizontal width XW, and the width of the zoom area ZE in the longitudinal direction (vertical direction) of the drawing is a vertical width YW.

Here, in the drawing, a point in the XY coordinate system having the lateral direction (horizontal direction) as the X direction and having the longitudinal direction (vertical direction) as the Y direction will be represented as coordinates (X, Y).

Now, when the coordinates of a point P11 that is the center position (central position) of the zoom area ZE are (XC, YC), the zoom area ZE can be specified using this center coordinates (XC, YC), the horizontal width XW, and the vertical width YW of the zoom area ZE. Accordingly, the center coordinates (XC, YC), the horizontal width XW, and the vertical width YW may be set as zoom area information.

In addition, in a case where the zoom area ZE is a rectangular area, for example, an upper left vertex P12 of the zoom area ZE in the drawing is set as a start point, and a lower right vertex P13 of the zoom area ZE in the drawing is set as an end point, and the zoom area ZE can be specified also using the coordinates (X0, Y0) of the start point (vertex P12) and the coordinates (X1, Y1) of the endpoint (vertex P13). Accordingly, the coordinates (X0, Y0) of the start point and the coordinates (X1, Y1) of the endpoint may be set as the zoom area information.

More specifically, the coordinates (X0, Y0) of the start point and the coordinates (X1, Y1) of the end point are set as the zoom area information. In such a case, for example, it may be configured such that the zoom area information presence flag illustrated in FIG. 4 is stored in the zoom area information header section ZHD described above, and the zoom area information illustrated in FIG. 5 is stored in each zoom area information data section ZD in accordance with the value of the zoom area information presence flag.

FIG. 4 is a diagram that illustrates the syntax of the zoom area information presence flag. In this example, "hasZoomAreaInfo" represents the zoom area information presence flag, and the value of the zoom area information presence flag hasZoomAreaInfo is one of "0" and "1".

Here, in a case where the value of the zoom area information presence flag hasZoomAreaInfo is "0", it represents that zoom area information is not included in the encoded content data. In contrast to this, in a case where the value of the zoom area information presence flag hasZoomAreaInfo is "1", it represents that zoom area information is included in the encoded content data.

In addition, in a case where the value of the zoom area information presence flag hasZoomAreaInfo is "1", zoom area information is stored in the zoom area information data section ZD of each frame. For example, the zoom area information is stored in the zoom area information data section ZD in syntax illustrated in FIG. 5.

In FIG. 5, "ZoomAreaX0" and "ZoomAreaY0" respectively represent X0 and Y0 that are the X coordinate and the Y coordinate of the start point of the zoom area ZE. In addition, "ZoomAreaX1" and "ZoomAreaY1" respectively represent X1 and Y1 that are the X coordinate and the Y coordinate of the end point of the zoom area ZE.

For example, in a case where the video of a content to be encoded is an 8K video, each of the values of "ZoomAreaX0" and "ZoomAreaX1" is set as one of values of 0 to 7679, and each of the values of "ZoomAreaY0" and "ZoomAreaY1" is set as one of values of 0 to 4319.

Specific Example 2 of Zoom Area Information

In addition, for example, also in a case where center coordinates (XC, YC), a horizontal width XW, and a vertical width YW are set as the zoom area information, the zoom area information presence flag hasZoomAreaInfo illustrated in FIG. 4 is stored in the zoom area information header section ZHD. When the value of the zoom area information presence flag hasZoomAreaInfo is "1", zoom area information is stored in the zoom area information data section ZD of each frame. In such a case, the zoom area information, for example, is stored in the zoom area information data section ZD in syntax illustrated in FIG. 6.

In the case of FIG. 6, "ZoomAreaXC" and "ZoomAreaYC" respectively represent XC and YC that are the X coordinate and the Y coordinate of the center coordinates (XC, YC) of the zoom area ZE.

In addition, "ZoomAreaXW" and "ZoomAreaYW" respectively represent the horizontal width XW and the vertical width YW of the zoom area ZE.

Also in this example, for example, in a case where the video of a content to be encoded is an 8K video, each of the values of "ZoomAreaXC" and "ZoomAreaXW" is set as one of values of 0 to 7679, and each of the values of "ZoomAreaYC" and "ZoomAreaYW" is set as one of values of 0 to 4319.

Specific Example 3 of Zoom Area Information

In addition, for example, in a case where the zoom area is specified using center coordinates (XC, YC), a horizontal width XW, and a vertical width YW, and the horizontal width XW and the vertical width YW are set as fixed values, only differences in the center coordinates (XC, YC) may be stored in the zoom area information data section ZD as the zoom area information.

In such a case, for example, in the zoom area information data section ZD-1 disposed in the data section DAF-1 of the first frame, the zoom area information illustrated in FIG. 6 is stored. In addition, in the zoom area information data section ZD disposed in the data section DAF of each of the second frame and subsequent frames, zoom area information is stored in syntax illustrated in FIG. 7.

In the case of FIG. 7, "nbits", "ZoomAreaXCshift", and "ZoomAreaYCshift" are stored as the zoom area information. "nbits" is bit number information that represents the number of bits of information of each of "ZoomAreaXCshift" and "ZoomAreaYCshift".

In addition, "ZoomAreaXCshift" represents a difference of XC that is the X coordinate of the center coordinates (XC, YC) from a predetermined reference value. For example, the reference value of the coordinate XC may be the X coordinate of the center coordinates (XC, YC) in the first frame or the X coordinate of the center coordinates (XC, YC) in a previous frame of the current frame.

"ZoomAreaYCshift" represents a difference of YC that is the Y coordinate of the center coordinates (XC, YC) from a predetermined reference value. For example, the reference value of the coordinate YC, similarly to the reference value of the coordinate XC, may be the Y coordinate of the center coordinates (XC, YC) in the first frame or the Y coordinate of the center coordinates (XC, YC) in a previous frame of the current frame.

Such "ZoomAreaXCshift" and "ZoomAreaYCshift" represents movement amounts from the reference values of the center coordinates (XC, YC).

Note that, for example, in a case where the reference values of the center coordinates (XC, YC) are known on the reproduction side of the content, a case where the reference values of the center coordinates (XC, YC) are stored in the zoom area information header section ZHD, or the like, the zoom area information illustrated in FIG. 7 may be stored in the zoom area information data section ZD of each frame.

Specific Example 4 of Zoom Area Information

In addition, for example, in a case where a zoom area is specified using center coordinates (XC, YC), a horizontal width XW, and a vertical width YW, and the center coordinates (XC, YC) are set as fixed values, only differences, in other words, change amounts in the horizontal width XW and the vertical width YW may be stored in the zoom area information data section ZD as zoom area information.

In such a case, for example, in the zoom area information data section ZD-1 disposed in the data section DAF-1 of the first frame, the zoom area information illustrated in FIG. 6 is stored. In addition, in the zoom area information data section ZD disposed in the data section DAF disposed in each of the second frame and subsequent frames, the zoom area information is stored in syntax illustrated in FIG. 8.

In FIG. 8, "nbits", "ZoomAreaXWshift", and "ZoomAreaYWshift" are stored as zoom area information. "nbits" is bit number information that represents the number of bits of information of each of "ZoomAreaXWshift" and "ZoomAreaYWshift".

In addition, "ZoomAreaXWshift" represents a change amount from a predetermined reference value of the horizontal width XW. For example, the reference value of the horizontal width XW may be a horizontal width XW in the first frame or a horizontal width XW of the previous frame of the current frame.

"ZoomAreaYWshift" represents a change amount from a reference value of the vertical width YW. For example, the reference value of the vertical width YW, similarly to the reference value of the horizontal width XW, may be a vertical width YW in the first frame or a vertical width YW of the previous frame of the current frame.

Note that, for example, in a case where the reference values of the horizontal width XW and the vertical width YW are known on the reproduction side of the content, a case where the reference values of the horizontal width XW and the vertical width YW are stored in the zoom area information header section ZHD, or the like, the zoom area information illustrated in FIG. 8 may be stored in the zoom area information data section ZD of each frame.

Specific Example 5 of Zoom Area Information

In addition, for example, in a case where a zoom area is specified using center coordinates (XC, YC), a horizontal width XW, and a vertical width YW, as is the cases in FIGS. 7 and 8, differences in the center coordinates (XC, YC), the horizontal width XW, and the vertical width YW may be stored in the zoom area information data section ZD as the zoom area information.

In such a case, for example, in the zoom area information data section ZD-1 disposed in the data section DAF-1 of the first frame, the zoom area information illustrated in FIG. 6 is stored. In addition, in the zoom area information data section ZD disposed in the data section DAF of each of the second frame and subsequent frames, zoom area information is stored in syntax illustrated in FIG. 9.

In the case of FIG. 9, "nbits", "ZoomAreaXCshift", "ZoomAreaYCshift", "ZoomAreaXWshift", and "ZoomAreaYWshift" are stored as the zoom area information.

"nbits" is bit number information that represents the number of bits of information of each of "ZoomAreaXCshift", "ZoomAreaYCshift", "ZoomAreaXWshift", and "ZoomAreaYWshift".

"ZoomAreaXCshift" and "ZoomAreaYCshift", as is the case in FIG. 7, respectively represent differences from the reference values of the X coordinate and the Y coordinate of the center coordinates (XC, YC).

In addition, "ZoomAreaXWshift" and "ZoomAreaYWshift", as is the case in FIG. 8, respectively represent change amounts from the reference values of the horizontal width XW and the vertical width YW.

Here, the reference values of the center coordinates (XC, YC), the horizontal width XW, and the vertical width YW may be set as center coordinates (XC, YC), a horizontal width XW, and a vertical width YW in the first frame or the previous frame of the current frame. In addition, in a case where the reference values of the center coordinates (XC, YC), the horizontal width XW, and the vertical width YW are known on the reproduction side of the content or a case where the reference values are stored in the zoom area information header section ZHD, zoom area information illustrated in FIG. 9 may be stored in the zoom area information data section ZD of each frame.

Specific Example 6 of Zoom Area Information

In addition, by combining the examples illustrated in FIGS. 6 to 9 described above, for example, zoom area information may be stored in each zoom area information data section ZD in syntax illustrated in FIG. 10.

In such a case, the zoom area information presence flag hasZoomAreaInfo illustrated in FIG. 4 is stored in the zoom area information header section ZHD. Further, when the value of the zoom area information presence flag hasZoomAreaInfo is "1", the zoom area information is stored in the zoom area information data section ZD of each frame. For example, the zoom area information is stored in the zoom area information data section ZD in the syntax illustrated in FIG. 10.

In the case illustrated in FIG. 10, at the start of the zoom area information, encoding mode information representing a format among the formats illustrated in FIGS. 6 to 9 in which the zoom area information, more specifically, information specifying the position of the zoom area is described is arranged. In FIG. 10, "mode" represents the encoding mode information.

Here, the value of the encoding mode information mode is set as one of values 0 to 3.

For example, in a case where the value of the encoding mode information mode is "0", as illustrated in "case 0" and below in the drawing, similarly to the example illustrated in FIG. 6, "ZoomAreaXC" representing the coordinate XC, "ZoomAreaYC" representing the coordinate YC, "ZoomAreaXW" representing the horizontal width XW, and "ZoomAreaYW" representing the vertical width YW are stored as the zoom area information.

On the other hand, in a case where the value of the encoding mode information mode is "1", as illustrated in "case 1" and below in the drawing, similarly to the example illustrated in FIG. 7, "nbits" that is the bit number information, "ZoomAreaXCshift" representing a difference in the coordinate XC, and "ZoomAreaYCshift" representing a difference in the coordinate YC are stored as the zoom area information.

In a case where the value of the encoding mode information mode is "2", as illustrated in "case 2" and below in the drawing, similarly to the example illustrated in FIG. 8, "nbits" that is the bit number information, "ZoomAreaXWshift" representing a change amount in the horizontal width XW, and "ZoomAreaYWshift" representing a change amount in the vertical width YW are stored as the zoom area information.

Furthermore, in a case where the value of the encoding mode information mode is "3", as illustrated in "case 3" and below in the drawing, similarly to the example illustrated in FIG. 9, "nbits" that is the bit number information, "ZoomAreaXCshift" representing a difference in the coordinate XC, "ZoomAreaYCshift" representing a difference in the coordinate YC, "ZoomAreaXWshift" representing a change amount in the horizontal width XW, and "ZoomAreaYWshift" representing a change amount in the vertical width YW are stored as the zoom area information.

Specific Example 7 of Zoom Area Information

In addition, while an example in which coordinate information is stored as the zoom area information has been described above, angle information specifying a zoom area may be stored in each zoom area information data section ZD as the zoom area information.

Figure 11:
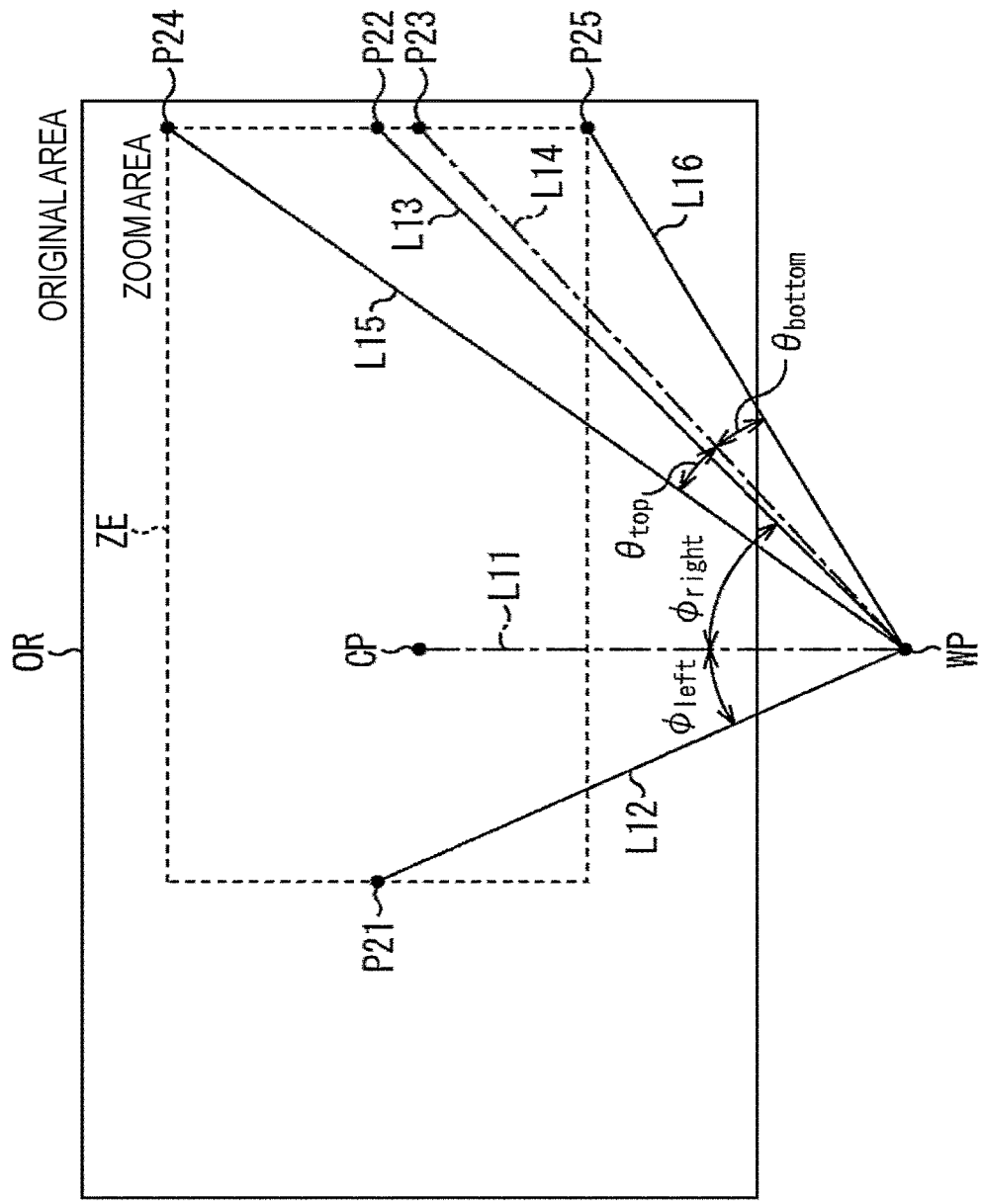
FIG. 11 is a diagram that illustrates zoom area information.

For example, as illustrated in FIG. 11, a point located at a position that has the same height as that of the center position CP of the original area OR and is separate from the center position CP to the front side in FIG. 11 by a predetermined distance is set as a watching point WP that is a reference at the time of watching the content. In addition, a positional relation between the center position CP and the watching point WP is assumed to be constantly the same positional relation regardless of a frame of the content. Note that, in FIG. 11, a same reference numeral is assigned to a part corresponding to that of the case illustrated in FIG. 3, and the description thereof will not be presented as is appropriate.

In FIG. 11, a straight line joining the center position CP and the watching point WP is set as a straight line L11. In addition, a center point of the left side of the zoom area ZE in the drawing is set as a point P21, and a straight line joining the point P21 and the watching point WP is set as a straight line L12. Furthermore, an angle formed by the straight line L11 and the straight line L12 is set as a horizontal angle $\phi_{left}$.

Similarly, a center point of the right side of the zoom area ZE in the drawing is set as a point P22, and a straight line joining the point P22 and the watching point WP is set as a straight line L13. In addition, an angle formed by the straight line L11 and the straight line L13 is set as a horizontal angle $\phi_{right}$.

In addition, a position having a same Y coordinate as that of the center position CP on the right side of the zoom area ZE in the drawing is set as a point P23, and a straight line joining the point P23 and the watching point WP is set as a straight line L14. In addition, an upper right vertex of the zoom area ZE in the drawing is set as a point P24, a straight line joining the point P24 and the watching point WP is set as a straight line L15, and an angle formed by the straight line L14 and the straight line L15 is set as an elevation angle $\theta_{top}$.

Similarly, a lower right vertex of the zoom area ZE in the drawing is set as a point P25, a straight line joining the point P25 and the watching point WP is set as a straight line L16, and an angle formed by the straight line L14 and the straight line L16 is set as an elevation angle $\theta_{bottom}$.

At this time, the zoom area ZE can be specified using the horizontal angle $\phi_{left}$, the horizontal angle $\phi_{right}$, the elevation angle $\theta_{top}$ and the elevation angle $\theta_{bottom}$. Accordingly, the horizontal angle $\phi_{left}$, the horizontal angle $\phi_{right}$, the elevation angle $\theta_{top}$ and the elevation angle $\theta_{bottom}$ may be stored in each zoom area information data section ZD illustrated in FIG. 2 as the zoom area information. In addition, change amounts of some or all the horizontal angle $\phi_{left}$, the horizontal angle $\phi_{right}$, the elevation angle $\theta_{top}$ and the elevation angle $\theta_{bottom}$ may be set as the zoom area information.

Specific Example 8 of Zoom Area Information

Figure 12:
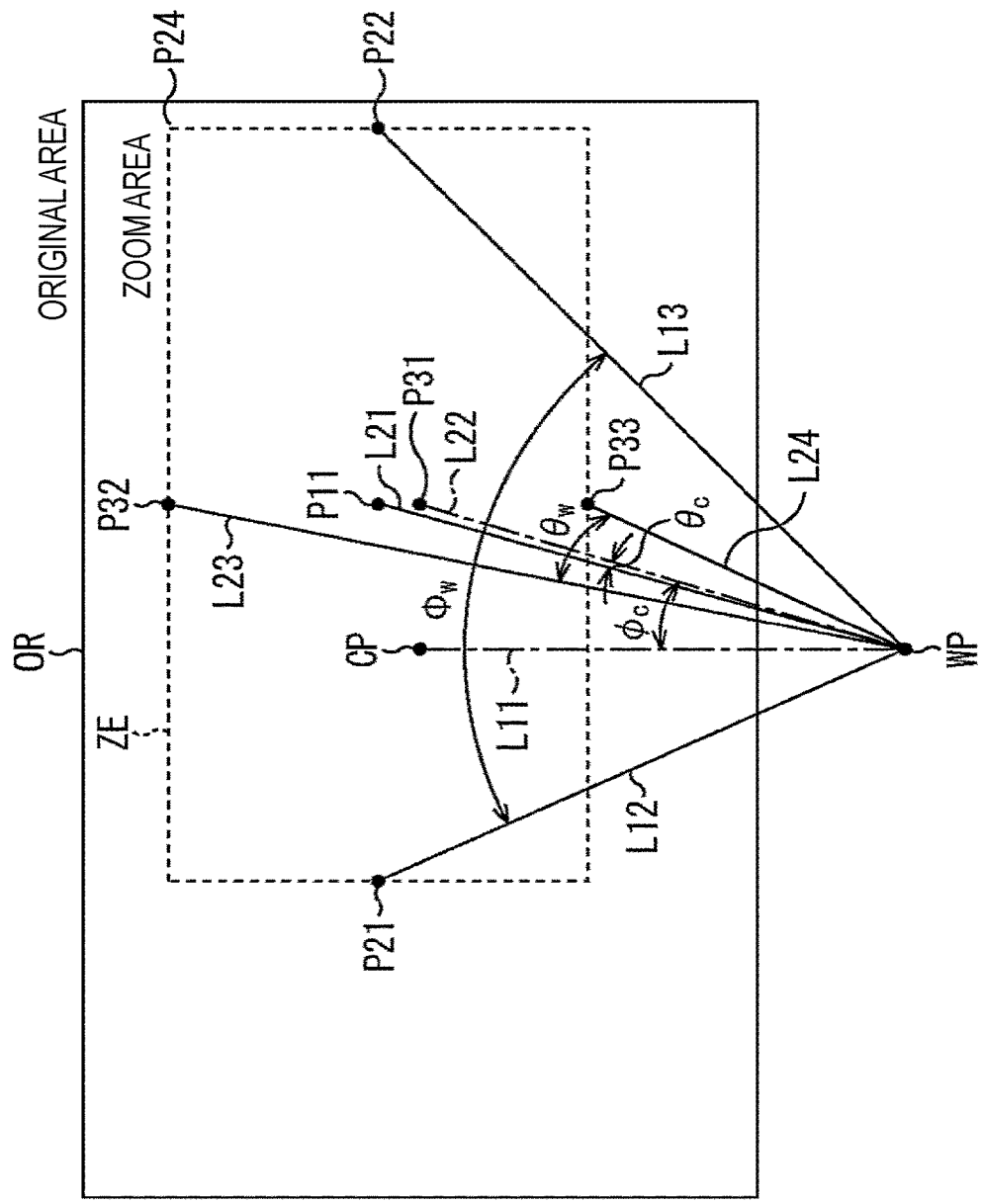
FIG. 12 is a diagram that illustrates zoom area information.

In addition, for example, as illustrated in FIG. 12, angle information determined based on positional relations among a center position CP, a point P11 located at the center position of the zoom area ZE, and a watching point WP may be set as the zoom area information. Note that, in FIG. 12, a same reference numeral is assigned to a part corresponding to that of the case illustrated in FIG. 3 or 11, and the description thereof will not be presented as is appropriate.

In FIG. 12, a straight line joining the point P11 located at the center position of the zoom area ZE and the watching point WP is set as a straight line L21. In addition, a point that has a same X coordinate as the point P11 located at the center position of the zoom area ZE and has a same Y coordinate as the center position CP of the original area OR is set as a point P31, and a straight line joining the point P31 and the watching point WP is set as a straight line L22.

In addition, a center point of the upper side of the zoom area ZE in the drawing is set as a point P32, a straight line joining the point P32 and the watching point WP is set as a straight line L23, a center point of the lower side of the zoom area ZE in the drawing is set as a point P33, and a straight line joining the point P33 and the watching point WP is set as a straight line L24.

Furthermore, an angle formed by the straight line L12 and the straight line L13 is set as a horizontal viewing angle $\phi_W$, and an angle formed by the straight line L11 and the straight line L22 is set as a horizontal angle $\phi_C$. In addition, an angle formed by the straight line L23 and the straight line L24 is set as a vertical viewing angle $\theta_W$, and an angle formed by the straight line L21 and the straight line L22 is set as an elevation angle $\theta_C$.

Here, the horizontal angle $\phi_C$ and the elevation angle $\theta_C$ respectively represent a horizontal angle and an elevation angle from the watching point WP with respect to the point P11 located at the center of the zoom area ZE.

At this time, the zoom area ZE can be specified using the horizontal viewing angle $\phi_W$, the horizontal angle $\phi_C$, the vertical viewing angle $\theta_W$ and the elevation angle $\theta_C$.

Accordingly, the horizontal viewing angle $\phi_W$, the horizontal angle $\phi_C$, the vertical viewing angle $\theta_W$ and the elevation angle $\theta_C$ or change amounts of such angles may be stored in each zoom area information data section ZD illustrated in FIG. 2 as the zoom area information.

In such a case, for example, the zoom area information presence flag hasZoomAreaInfo illustrated in FIG. 4 is stored in the zoom area information header section ZHD. Further, when the value of the zoom area information presence flag hasZoomAreaInfo is "1", the zoom area information is stored in the zoom area information data section ZD of each frame. For example, the zoom area information is stored in the zoom area information data section ZD in the syntax illustrated in FIG. 13.

In the case illustrated in FIG. 13, at the start of the zoom area information, encoding mode information representing a format among a plurality of formats in which the zoom area information, more specifically, information specifying the position of the zoom area is described is arranged.

In FIG. 13, "mode" represents the encoding mode information, and the value of the encoding mode information mode is set as one of values 0 to 3.

For example, in a case where the value of the encoding mode information mode is "0", as illustrated in "case 0" and below in the drawing, "ZoomAreaAZC" representing the horizontal angle $\phi_C$, "ZoomAreaELC" representing the elevation angle $\theta_C$, "ZoomAreaAZW" representing the horizontal viewing angle $\phi_W$, and "ZoomAreaELW" representing the vertical viewing angle $\theta_W$ are stored as the zoom area information.

In a case where the value of the encoding mode information is "1", as illustrated in "case 1" and below in the drawing, "nbits" representing bit number information, "ZoomAreaAZCshift" representing a shift angle of the horizontal angle $\phi_C$, and "ZoomAreaELCshift" representing a shift angle of the elevation angle $\theta_C$ are stored as the zoom area information.

Here, the bit number information nbits is information that represents the number of bits of information of each of "ZoomAreaAZCshift" and "ZoomAreaELCshift".

In addition, "ZoomAreaAZCshift" and "ZoomAreaELCshift" are set as differences between the horizontal angle $\phi_C$ and the elevation angle $\theta_C$ of the previous frame of the current frame or a horizontal angle $\phi_C$ and an elevation angle $\theta_C$ that are predetermined references and the horizontal angle $\phi_C$ and the elevation angle $\theta_C$ of the current frame or the like.

In a case where the value of the encoding mode information mode is "2", as illustrated in "case 2" and below in the drawing, "nbits" representing bit number information, "ZoomAreaAZWshift" representing a change amount of the horizontal viewing angle $\phi_W$, and "ZoomAreaELWshift" representing a change amount of the vertical viewing angle $\theta_W$ are stored as the zoom area information.

Here, the bit number information nbits is information that represents the number of bits of information of each of "ZoomAreaAZWshift" and "ZoomAreaELWshift".

In addition, "ZoomAreaAZWshift" and "ZoomAreaELWshift" are set as differences between the horizontal viewing angle $\phi_W$ and the vertical viewing angle $\theta_W$ of the previous frame of the current frame or a horizontal viewing angle $\phi_W$ and a vertical viewing angle $\theta_W$ that are predetermined references and the horizontal viewing angle $\phi_W$ and the vertical viewing angle $\theta_W$ of the current frame or the like.

In addition, in a case where the value of the encoding mode information mode is "3", as illustrated in "case 3" and below in the drawing, "nbits" representing bit number information, "ZoomAreaAZCshift" representing a shift angle of the horizontal angle $\phi_C$, "ZoomAreaELCshift" representing a shift angle of the elevation angle $\theta_C$, "ZoomAreaAZWshift" representing a change amount of the horizontal viewing angle $\phi_W$, and "ZoomAreaELWshift" representing a change amount of the vertical viewing angle $\theta_W$ are stored as the zoom area information.

In this case, the bit number information nbits is information that represents the number of bits of information of each of "ZoomAreaAZCshift", "ZoomAreaELCshift", "ZoomAreaAZWshift", and "ZoomAreaELWshift".

Note that the configuration of the zoom area information is not limited to the example illustrated in FIG. 13, and only "ZoomAreaAZC", "ZoomAreaELC", "ZoomAreaAZW", and "ZoomAreaELW" may be set as the zoom area information. Furthermore, both sides of "ZoomAreaAZCshift" and "ZoomAreaELCshift" and "ZoomAreaAZWshift" and "ZoomAreaELWshift" or only one side thereof may be set as the zoom area information.

Specific Example 9 of Zoom Area Information

In addition, while a case where there is only one piece of the zoom area information has been described as above, a plurality of the pieces of the zoom area information may be stored in the zoom area information data section ZD. In other words, by designating a plurality of zoom areas for one content, the zoom area information may be stored in the zoom area information data section ZD for each of the zoom areas.

In such a case, for example, each information is stored in the zoom area information header section ZHD in syntax illustrated in FIG. 14, and the zoom area information is further stored in the zoom area information data section ZD of each frame in syntax illustrated in FIG. 15.

In the example illustrated in FIG. 14, "hasZoomAreaInfo" represents a zoom area information presence flag. In a case where the value of the zoom area information presence flag hasZoomAreaInfo is "1", "numZoomAreas" is stored following the zoom area information presence flag hasZoomAreaInfo.

Here, "numZoomAreas" represents zoom area number information representing the number of pieces of zoom area information described in the zoom area information data section ZD, in other words, the number of zoom areas set for a content. In this example, the value of the zoom area number information numZoomAreas is one of values 0 to 15.

In the encoded content data, zoom area information, more specifically, information specifying the position of each zoom area corresponding to a value acquired by adding one to the value of the zoom area number information numZoomAreas is stored in the zoom area information data section ZD.

Accordingly, for example, in a case where the value of the zoom area number information numZoomAreas is "0", in the zoom area information data section ZD, for one zoom area, information specifying the position of the zoom area is stored.

In addition, in a case where the value of the zoom area information presence flag hasZoomAreaInfo is "1", the zoom area information is stored in the zoom area information data section ZD. For example, the zoom area information is described in the zoom area information data section ZD in syntax illustrated in FIG. 15.

In the example illustrated in FIG. 15, the zoom area information corresponding to a number represented by the zoom area number information numZoomAreas is stored.

In FIG. 15, "mode[idx]" represents encoding mode information for a zoom area specified by an index idx, and the value of the encoding mode information mode[idx] is set as one of values 0 to 3. Note that the index idx is each value of 0 to numZoomAreas.

For example, in a case where the value of the encoding mode information mode[idx] is "0", as illustrated in "case 0" and below in the drawing, "ZoomAreaXC[idx]" representing the coordinate XC, "ZoomAreaYC[idx]" representing the coordinate YC, "ZoomAreaXW[idx]" representing the horizontal width XW, and "ZoomAreaYW[idx]" representing the vertical width YW are stored as the zoom area information of a zoom area specified by the index idx.

In addition, in a case where the value of the encoding mode information mode[idx] is "1", as illustrated in "case 1" and below in the drawing, "nbits" that is bit number information, "ZoomAreaXCshift[idx]" representing a difference in the coordinate XC, and "ZoomAreaYCshift[idx]" representing a difference in the coordinate YC are stored as the zoom area information of a zoom area specified by the index idx. Here, the bit number information nbits represents the number of bits of information of each of "ZoomAreaXCshift[idx]" and "ZoomAreaYCshift[idx]".

In a case where the value of the encoding mode information mode[idx] is "2", as illustrated in "case 2" and below in the drawing, "nbits" representing bit number information, "ZoomAreaXWshift[idx]" representing a change amount in the horizontal width XW, and "ZoomAreaYWshift[idx]" representing a change amount in the vertical width YW are stored as the zoom area information of a zoom area specified by the index idx. Here, the bit number information nbits represents the number of bits of information of each of "ZoomAreaXWshift[idx]" and "ZoomAreaYWshift[idx]".

Furthermore, in a case where the value of the encoding mode information mode[idx] is "3", as illustrated in "case 3" and below in the drawing, "nbits" that is bit number information, "ZoomAreaXCshift[idx]" representing a difference in the coordinate XC, "ZoomAreaYCshift[idx]" representing a difference in the coordinate YC, "ZoomAreaXWshift[idx]" representing a change amount in the horizontal width XW, and "ZoomAreaYWshift[idx]" representing a change amount in the vertical width YW are stored as the zoom area information of a zoom area specified by the index idx. Here, the bit number information nbits represents the number of bits of information of each of "ZoomAreaXCshift[idx]", "ZoomAreaYCshift[idx]", "ZoomAreaXWshift[idx]", and "ZoomAreaYWshift[idx]".

In the example illustrated in FIG. 15, the encoding mode information mode [idx] and the zoom area information corresponding to the number of zoom areas are stored in the zoom area information data section ZD.

Note that, alternatively, the zoom area information may be configured only by the coordinate XC and the coordinate YC, the horizontal angle $\phi_C$ and the elevation angle $\theta_C$, a difference in the coordinate XC and a difference in the coordinate YC, or a difference in the horizontal angle $\phi_C$ and a difference in the elevation angle $\theta_C$.

In such a case, the horizontal width XW and the vertical width YW and the horizontal viewing angle $\phi_W$ and the vertical viewing angle $\theta_W$ may be set on the reproduction side. At that time, the horizontal width XW and the vertical width YW and the horizontal viewing angle $\phi_W$ and the vertical viewing angle $\theta_W$ may be automatically set in reproduction-side equipment or may be designated by the user.

In such an example, for example, in a case where the content is a video and an audio of a ball game, the coordinate XC and the coordinate YC representing the position of a ball are set as the zoom area information, and the horizontal width XW and the vertical width YW that are fixed or designated by the user are used on reproduction-side equipment.

<Zoom Area Auxiliary Information>

In addition, in the zoom area information header section ZHD, as zoom area auxiliary information, supplementary information such as an ID representing reproduction target equipment or the purpose of zoom and the other text information may be included.

In such a case, in the zoom area information header section ZHD, for example, in the syntax illustrated in FIG. 16, the zoom area information presence flag hasZoomAreaInfo and the zoom area auxiliary information are stored.

In the example illustrated in FIG. 16, the zoom area information presence flag hasZoomAreaInfo is arranged at the start, and, in a case where the value of this zoom area information presence flag hasZoomAreaInfo is "1", each information such as the zoom area auxiliary information is stored thereafter.

In other words, in this example, following the zoom area information presence flag hasZoomAreaInfo, the zoom area number information "numZoomAreas" representing the number of pieces of zoom area information described in the zoom area information data section ZD is stored. Here, the value of the zoom area number information numZoomAreas is set as one of values of 0 to 15.

In addition, after the zoom area number information numZoomAreas, information of each zoom area, which is specified by the index idx, corresponding to the number represented by the zoom area number information numZoomAreas is arranged. Here, the index idx is set as each value of 0 to numZoomAreas.

In other words, "hasExtZoomAreaInfo[idx]" following the zoom area number information numZoomAreas represents an auxiliary information flag representing whether or not zoom area auxiliary information of a zoom area specified by the index idx is stored. Here, the value of the auxiliary information flag hasExtZoomAreaInfo[idx] is set as one of "0" and "1".

In a case where the value of the auxiliary information flag hasExtZoomAreaInfo[idx] is "0", it represents that the zoom area auxiliary information of a zoom area specified by the index idx is not stored in the zoom area information header section ZHD. In contrast to this, in a case where the value of the auxiliary information flag hasExtZoomAreaInfo[idx] is "1", it represents that the zoom area auxiliary information of a zoom area specified by the index idx is stored in the zoom area information header section ZHD.

In a case where the value of the auxiliary information flag hasExtZoomAreaInfo[idx] is "1", after the auxiliary information flag hasExtZoomAreaInfo[idx], "ZoomAreaSpecifiedID[idx]" that is a specification ID representing the specification of a zoom area specified by the index idx is arranged.

In addition, "hasZoomAreaCommentary" represents a supplementary information flag representing whether or not new supplementary information other than the specification ID such as text information including a description of a zoom area and the like is present for the zoom area specified by the index idx.

For example, in a case where the value of this supplementary information flag hasZoomAreaCommentary is "0", it represents that the supplementary information is not present. In contrast to this, in a case where the value of this supplementary information flag hasZoomAreaCommentary is "1", it represents that the supplementary information is present, and, following the supplementary information flag hasZoomAreaCommentary, "nbytes" that is byte number information, and "ZoomAreaCommentary[idx]" that is the supplementary information are arranged.

Here, the byte number information nbytes represents the number of bytes of the information of the supplementary information ZoomAreaCommentary[idx]. In addition, the supplementary information ZoomAreaCommentary[idx] is set as text information describing a zoom area specified by the index idx.

More specifically, for example, it is assumed that a content is configured by a live video and an audio thereof, and a zoom area specified by the index idx is a zoom area for the purpose of continuously zooming a vocalist as a video object. In such a case, for example, text information such as "vocal zoom" is set as the supplementary information ZoomAreaCommentary[idx].

In the zoom area information header section ZHD, as is necessary, sets of the auxiliary information flag hasExtZoomAreaInfo[idx], ZoomAreaSpecifiedID[idx] that is a specification ID, the supplementary information flag hasZoomAreaCommentary, the byte number information nbytes, and the supplementary information ZoomAreaCommentary[idx] corresponding to a number represented using the zoom area number information numZoomAreas are stored. However, for a zoom area of which the value of the auxiliary information flag hasExtZoomAreaInfo[idx] is "0", ZoomAreaSpecifiedID[idx], the supplementary information flag hasZoomAreaCommentary, the byte number information nbytes, and the supplementary information ZoomAreaCommentary[idx] are not stored. Similarly, for a zoom area of which the value of the supplementary information flag hasZoomAreaCommentary is "0", the byte number information nbytes and the supplementary information ZoomAreaCommentary[idx] are not stored.

In addition, ZoomAreaSpecifiedID[idx] that is the specification ID is information that represents specifications of zoom such as reproduction target equipment for a zoom area and the purpose of the zoom, and, for example, as illustrated in FIG. 17, a specification of zoom is set for each value of ZoomAreaSpecifiedID[idx].

In this example, for example, in a case where the value of ZoomAreaSpecifiedID[idx] is "1", it represents that a zoom area of a zoom specification represented by the specification ID is a zoom area assuming the reproduction target equipment to be a projector.

In addition, in a case where the value of ZoomAreaSpecifiedID[idx] is two to four, the values respectively represent that zoom areas of zoom specifications represented by the specification IDs are zoom areas assuming the reproduction target equipment to be a television receiver having a screen size over 50 type, 30 type to 50 type, and less than 30 type.

In this way, in the example illustrated in FIG. 17, the zoom area information of which the value of ZoomAreaSpecifiedID[idx] is one of "1" to "4" is information representing a zoom area set for each type of reproduction target equipment.

In addition, for example, in a case where the value of ZoomAreaSpecifiedID[idx] is "7", it represents that the zoom area of a zoom specification represented by the specification ID is a zoom area assuming reproduction target equipment to be a smartphone and the rotation direction of the smartphone to be a vertical direction.

Here, the rotation direction of the smartphone being the vertical direction represents that the direction of the smartphone at the time of user's watching a content using the smartphone is the vertical direction, in other words, that the longitudinal direction of the display screen of the smartphone is the vertical direction (upward/downward direction) seen from the user. Accordingly, in a case where the value of ZoomAreaSpecifiedID[idx] is "7", the zoom area, for example, is regarded as a vertically-long area.

In addition, for example, in a case where the value of ZoomAreaSpecifiedID[idx] is "8", it represents that the zoom area of a zoom specification represented by the specification ID is a zoom area assuming reproduction target equipment to be a smartphone and the rotation direction of the smartphone to be a horizontal direction. In this case, the zoom area, for example, is regarded as a horizontally-long area.

In this way, in the example illustrated in FIG. 17, each zoom area information of which the value of ZoomAreaSpecifiedID[idx] is one of "5" to "8" is information representing a zoom area set for the type of reproduction target equipment and the rotation direction of the reproduction target equipment.

In addition, for example, in a case where the value of ZoomAreaSpecifiedID[idx] is "9", it represents that the zoom area of a zoom specification represented by the specification ID is a zoom area having a predetermined purpose of zoom that is set by a content producer. Here, the predetermined purpose of zoom, for example, is displaying a specific zoom view such as zoom displaying a predetermined video object.

Accordingly, for example, in a case where the value of ZoomAreaSpecifiedID[idx], which is "9", represents a specification of zoom for the purpose of continuously zooming a vocalist, the supplementary information ZoomAreaCommentary[idx] of the index idx is set as text information such as "vocal zoom". A user can acquire the content of the specification of zoom that is represented by each specification ID on the basis of the specification ID or information associated with the specification ID, the supplementary information for the specification ID, and the like.

In this way, in the example illustrated in FIG. 17, each zoom area information of which the value of ZoomAreaSpecifiedID[idx] is one of "9" to "15" is information representing an arbitrary zoom area that is freely set by the content producer side, for example, such as a zoom area set for each specific video object.

Figure 18:
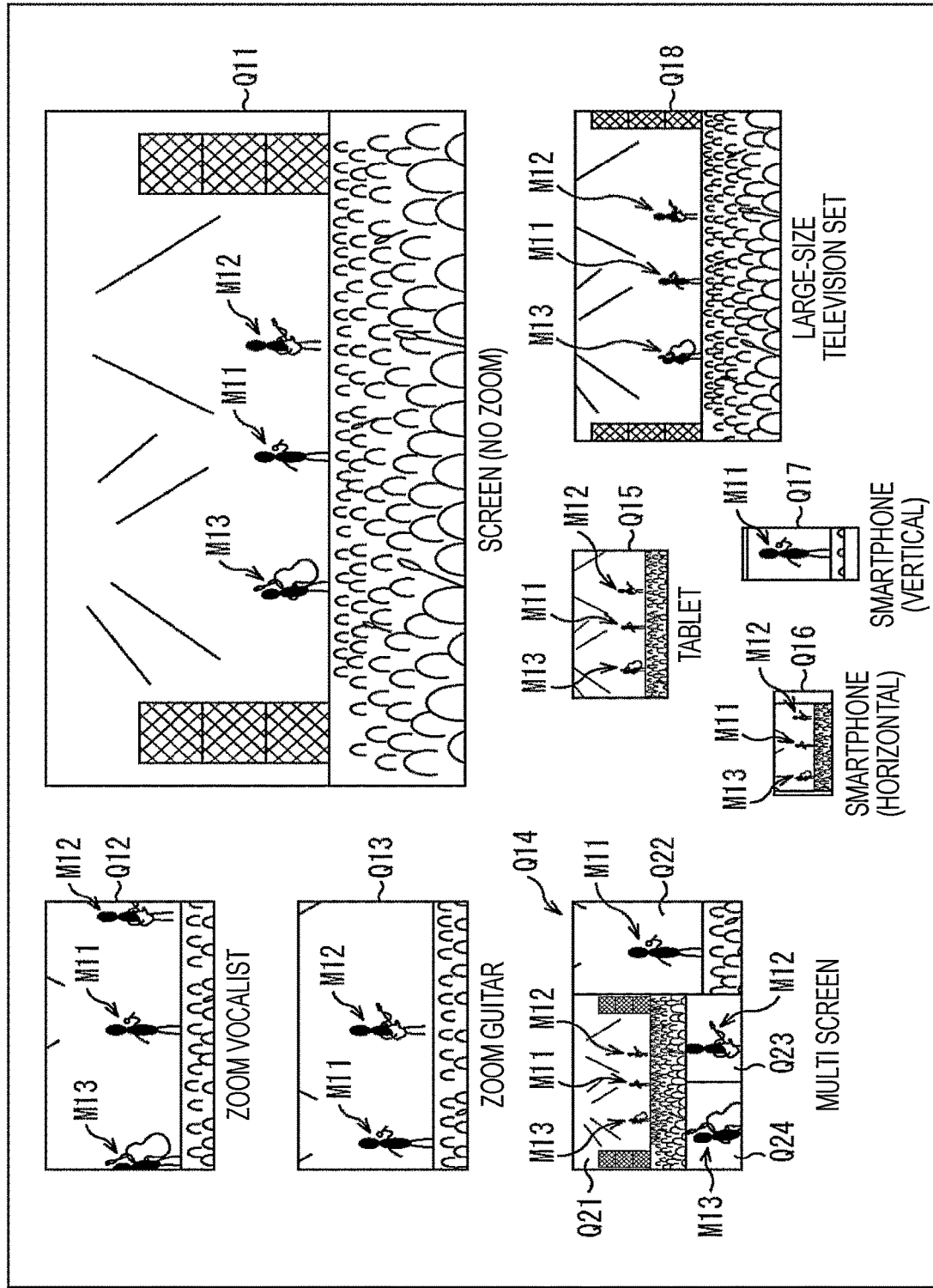
FIG. 18 is a diagram that illustrates an example of a reproduced content.

As above, by setting one or a plurality of zoom areas for one content, for example, as illustrated in FIG. 18, a content matching a user's taste in a simplified manner or a content appropriate for each reproduction equipment can be provided.

In FIG. 18, an image Q11 illustrates a video (image) of a predetermined content. This content is a content of a live video, and the image Q11 is a wide-angle image in which a vocalist M11, a guitarist M12, and a bassist M13 who are live players are projected, and the whole state, the audience, and the like are projected.

A content producer, for the image Q11 configuring such a content, sets one or a plurality of zoom areas in accordance with specifications of zoom such reproduction target equipment or the purpose of zoom.

For example, in order to display a zoom view zooming up the vocalist M11 that is a video object, in a case where an area on the image Q11 having the vocalist M11 as its center is set as the zoom area, an image Q12 can be reproduced on the reproduction side as a content.

Similarly, for example, in order to display a zoom view zooming up the guitarist M12 that is a video object, in a case where an area on the image Q11 having the guitarist M12 as its center is set as the zoom area, an image Q13 can be reproduced on the reproduction side as a content.

In addition, for example, by selecting a plurality of zoom areas on the reproduction side and configuring one screen by aligning such zoom areas, an image Q14 can be reproduced on the reproduction side as a content.

In this example, the image Q14 is configured by an image Q21 of a zoom area having a viewing angle slightly smaller than that of the image Q11, an image Q22 of a zoom area zooming up the vocalist M11, an image Q23 of a zoom area zooming up the guitarist M12, and an image Q24 of a zoom area zooming up the bassist M13. In other words, the image Q14 has a multi-screen configuration. In a case where the content provider side sets a plurality of zoom areas in advance, on the content reproduction side, by selecting several zoom areas, the content can be reproduced by employing the multi-screen configuration such as the image Q14.

In addition, for example, in a case where a viewing angle that is a half of that of the image Q11 is set in consideration of a reproduction apparatus such as a tablet PC having a display screen that is not that large, in other words, in a case where a region having an about half area of the whole image Q11 including the center of the image Q11 is set as a zoom area, an image Q15 can be reproduced on the reproduction side as a content. In this example, also in reproduction equipment having a display screen that is not that large, each player can be displayed in a sufficient size.

In addition, for example, in a case where a horizontally-long area that is relatively narrow within the image Q11 including the center of the image Q11 is set as a zoom area in consideration of a smartphone of which the rotation direction is the horizontal direction, in other words, of which the display screen is in a horizontally-long state, an image Q16 can be reproduced on the reproduction side as a content.

For example, in a case where a vertically-long area near the center of the image Q11 is set as a zoom area in consideration of a smartphone of which the rotation direction is the vertical direction, in other words, of which the display screen is in a vertically-long state, an image Q17 can be reproduced on the reproduction side as a content.

In the image Q17, the vocalist M11 who is one of the players is displayed with being zoomed up. In this example, since a small vertically-long display screen is considered, instead of displaying all the players aligned in the horizontal direction, displaying one player with zoomed up is appropriate display for the reproduction target equipment, and thus, such a zoom area is set.

In addition, for example, in consideration of reproduction equipment having a relatively large display screen such as a large-size television receiver, in a case where the viewing angle is set to be slightly smaller than that of the image Q11, in other words, in a case where a relatively large area within the image Q11 including the center of the image Q11 is set as a zoom area, an image Q18 can be reproduced on the reproduction side as a content.

As above, by setting zoom areas on the content provider side and generating encoded content data including zoom area information representing the zoom areas, on the reproduction side, a user who is a person watching the content can select direct reproduction of the content or zoom reproduction on the basis of the zoom area information, in other words, trimming reproduction.

Particularly, in a case where a plurality of pieces of zoom area information are present, the user can select zoom reproduction according to specific zoom area information among such plurality of pieces of zoom area information.

In addition, in a case where the zoom area auxiliary information is stored in the encoded content data, on the reproduction side, by referring to the reproduction target equipment, the purpose of zoom, the specifications of the zoom such as contents of the zoom, and the supplementary information, a zoom area that is appropriate for the reproduction equipment or a user's taste can be selected. The selection of the zoom area may be designated by the user or may be automatically performed by the reproduction equipment.

<Description of Encoding Process>

Next, a specific operation of the encoding device 11 will be described.

Figure 19:
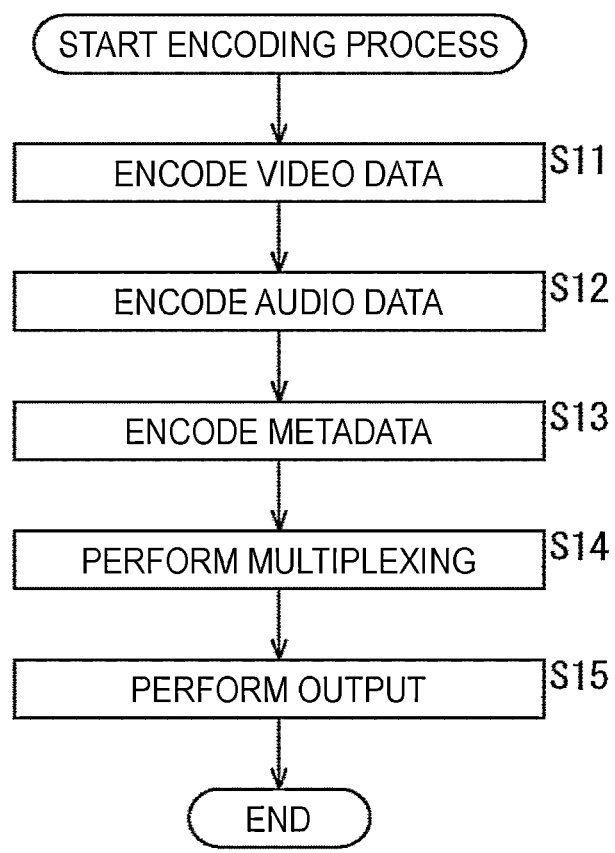
FIG. 19 is a flowchart that illustrates an encoding process.

When video data and audio data configuring a content and metadata of the content are supplied from the outside, the encoding device 11 performs an encoding process and outputs encoded content data. Hereinafter, the encoding process performed by the encoding device 11 will be described with reference to a flowchart illustrated in FIG. 19.

In Step S11, the video data encoding unit 21 encodes the video data of the supplied content and supplies encoded video data acquired as a result thereof to the multiplexer 24.

In Step S12, the audio data encoding unit 22 encodes the audio data of the supplied content and supplies encoded audio data acquired as a result thereof to the multiplexer 24.

In Step S13, the metadata encoding unit 23 encodes the metadata of the supplied content and supplies encoded metadata acquired as a result thereof to the multiplexer 24.

Herein in the metadata to be encoded, for example, the zoom area information described above is included. The zoom area information, for example, may be any information other than that described with reference to FIGS. 5 to 10, 13 and 15, and the like.

In addition, the metadata encoding unit 23 also encodes the header information of the zoom area information such as the zoom area information presence flag hasZoomAreaInfo, the zoom area number information numZoomAreas, and the zoom area auxiliary information as is necessary and supplies the encoded header information to the multiplexer 24.

In Step S14, the multiplexer 24 generates a bit stream by multiplexing the encoded video data supplied from the video data encoding unit 21, the encoded audio data supplied from the audio data encoding unit 22, and the encoded metadata supplied from the metadata encoding unit 23 and supplies the generated bit stream to the output unit 25. At this time, the multiplexer 24 also stores the encoded header information of the zoom area information, which is supplied from the metadata encoding unit 23, in the bit stream.

Accordingly, for example, the encoded content data illustrated in FIG. 2 can be acquired as the bit stream. Note that the configuration of the zoom area information header section ZHD of the encoded content data, for example, may be any configuration such as the configuration illustrated in FIG. 4, 14, or 16.

In Step S15, the output unit 25 outputs the bit stream supplied from the multiplexer 24, and the encoding process ends.

As above, the encoding device 11, together with the content, encodes the metadata including the zoom area information, thereby generating a bit stream.

In this way, by generating the bit stream including the zoom area information used for designating a zoom area, without preparing a content for each reproduction equipment, a content matching a user's taste or a content appropriate for each reproduction equipment can be provided in a simplified manner.

In other words, a content producer can provide a content that is considered to be optimal for a user's taste, the screen size of the reproduction equipment, the rotation direction of the reproduction equipment, and the like in a simplified member only by designating a zoom area without preparing the content for each taste or each reproduction equipment.

In addition, on the reproduction side, by selecting a zoom area and trimming a content as is necessary, a content that is optimal for the user's taste, the screen size of the reproduction equipment, the rotation direction of the reproduction equipment, and the like can be watched.

<Example of Configuration of Reproduction Device>

Next, a reproduction device that receives a bit stream output from the encoding device 11, in other words, encoded content data and reproduces the content will be described.

Figure 20:
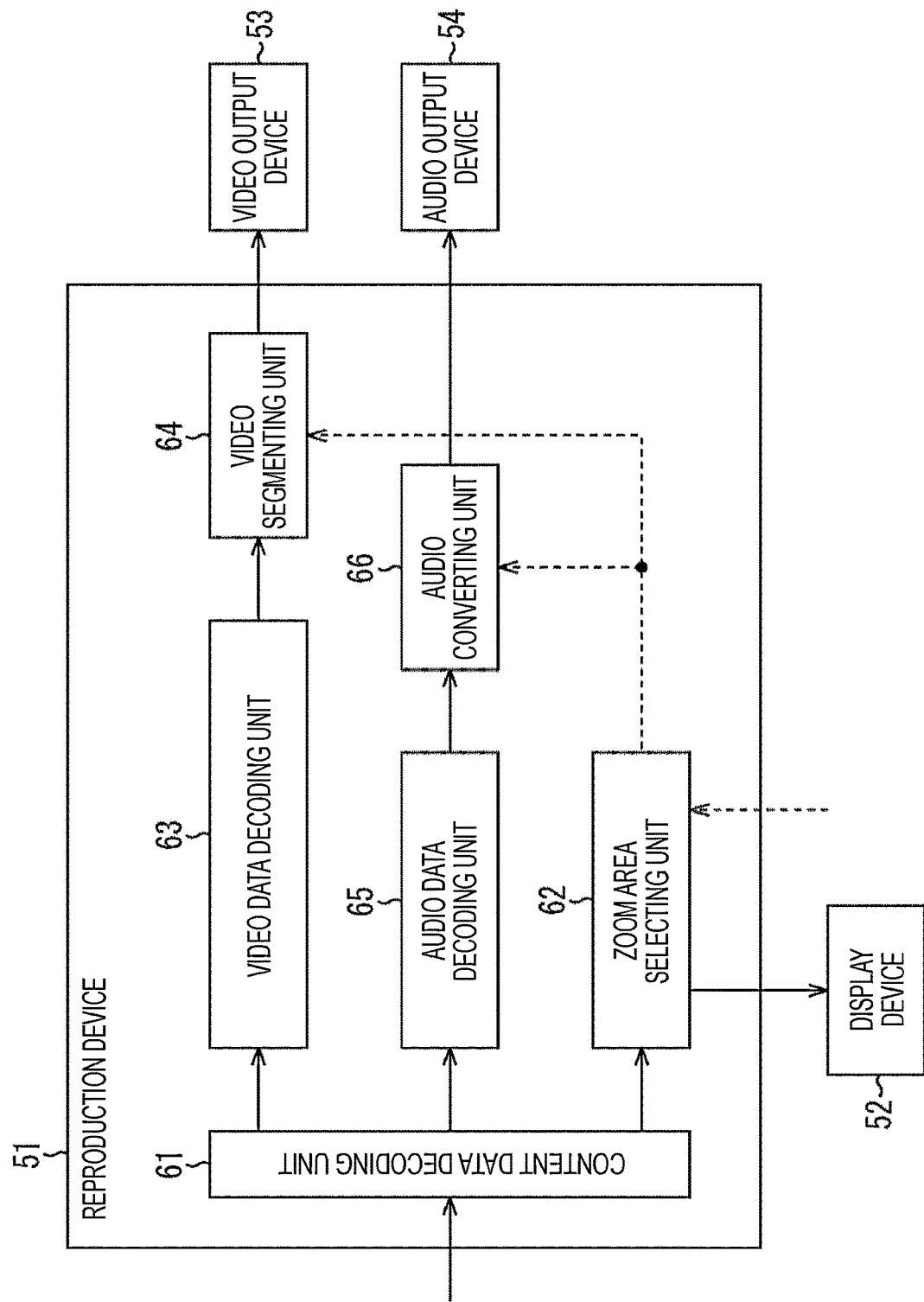
FIG. 20 is a diagram that illustrates an example of the configuration of a reproduction device.

FIG. 20 is a diagram that illustrates an example of the configuration of the reproduction device according to an embodiment of the present technology.

In this example, as is necessary, a display device 52 displaying information at the time of selecting a zoom area, a video output device 53 outputting a video of the content, and an audio output device 54 outputting an audio of the content are connected to a reproduction device 51.

Note that the display device 52, the video output device 53, and the audio output device 54 may be disposed in the reproduction device 51. In addition, the display device 52 and the video output device 53 may be the same device.

The reproduction device 51 includes: a content data decoding unit 61; a zoom area selecting unit 62; a video data decoding unit 63; a video segmenting unit 64; an audio data decoding unit 65; and an audio converting unit 66.

The content data decoding unit 61 receives a bit stream transmitted from the encoding device 11, in other words, encoded content data and separates encoded video data, encoded audio data, and encoded metadata from the encoded content data.

The content data decoding unit 61 supplies the encoded video data to the video data decoding unit 63 and supplies the encoded audio data to the audio data decoding unit 65.

The content data decoding unit 61 acquires metadata by decoding the encoded metadata and supplies the acquired metadata to each unit of the reproduction device 51 as is necessary. In addition, in a case where zoom area information is included in the metadata, the content data decoding unit 61 supplies the zoom area information to the zoom area selecting unit 62. Furthermore, in a case where zoom area auxiliary information is stored in the bit stream, the content data decoding unit 61 reads the zoom area auxiliary information, decodes the zoom area auxiliary information as is necessary, and supplies resultant zoom area auxiliary information to the zoom area selecting unit 62.

The zoom area selecting unit 62 selects one piece of zoom area information from among one or a plurality of pieces of zoom area information supplied from the content data decoding unit 61 and supplies the selected zoom area information to the video segmenting unit 64 and the audio converting unit 66 as selection zoom area information. In other words, in the zoom area selecting unit 62, a zoom area is selected on the basis of the zoom area information supplied from the content data decoding unit 61.

For example, in a case where zoom area auxiliary information is supplied from the content data decoding unit 61, the zoom area selecting unit 62 supplies the zoom area auxiliary information to the display device 52 so as to be displayed thereon. In this way, for example, on the display device 52, supplementary information such as the purpose and the content of the zoom area, a specification ID representing the specification of the zoom such as reproduction target equipment and the like, information based on the specification ID, and text information is displayed as the zoom area auxiliary information.

Then, the user checks the zoom area auxiliary information displayed on the display device 52 and selects a desired zoom area by operating an input unit not illustrated in the drawing. The zoom area selecting unit 62 selects a zoom area on the basis of a signal according to user's operation supplied from the input unit and outputs selection zoom area information representing the selected zoom area. In other words, the zoom area information of the zoom area designated by the user is selected, and the selected zoom area information is output as selection zoom area information.

Note that the selection of a zoom area may be performed using any method such as a method in which information representing the position and the size of each zoom area is generated from the zoom area information by the zoom area selecting unit 62 and is displayed on the display device 52, and the user selects a zoom area on the basis of the display.

Note that, in a case where the selection of a zoom area is not performed, in other words, in a case where the reproduction of the original content is selected, the selection zoom area information is set as information indicating no trimming or the like.

Furthermore, for example, in a case where the reproduction device 51 records reproduction equipment information representing the type of the own equipment such as a smartphone or a television receiver in advance, the zoom area information (zoom area) may be selected by using the reproduction equipment information.

In such a case, for example, the zoom area selecting unit 62 acquires the reproduction equipment information and selects zoom area information by using the acquired reproduction equipment information and the zoom area auxiliary information.

More specifically, the zoom area selecting unit 62 selects a specification ID representing that reproduction target equipment is equipment of a type represented by the reproduction equipment information from among specification IDs as zoom area auxiliary information. Then, the zoom area selecting unit 62 sets zoom area information corresponding to the selected specification ID, in other words, zoom area information of which the index idx is the same as that of the selected specification ID as selected zoom area information.

In addition, for example, in a case where the reproduction device 51 is a mobile device such as a smartphone or a tablet PC, the zoom area selecting unit 62 may acquire direction information representing the rotation direction of the reproduction device 51 from a gyro sensor not illustrated in the drawing or the like and select zoom area information by using the direction information.

In such a case, for example, the zoom area selecting unit 62 selects a specification ID representing that the reproduction target equipment is equipment of a type represented by the reproduction equipment information, and an assumed rotation direction is a direction represented by the acquired direction information from among specification IDs as the zoom area auxiliary information. Then, the zoom area selecting unit 62 sets zoom area information corresponding to the selected specification ID as selected zoom area information. In this way, also in both a state in which the user uses the reproduction device 51 in the vertical direction (a vertically-long screen) and a state in which the user uses the reproduction device 51 in the horizontal direction (horizontally-long screen), zoom area information of a zoom area that is optimal for the current state is selected.

Note that, other than that, the zoom area information may be selected using only one of the reproduction equipment information and the direction information, or the zoom area information may be selected using any other information relating to the reproduction device 51.

The video data decoding unit 63 decodes encoded video data supplied from the content data decoding unit 61 and supplies video data acquired as a result thereof to the video segmenting unit 64.

The video segmenting unit 64 trims (segments) a zoom area represented by the selection zoom area information supplied from the zoom area selecting unit 62 from a video (image) that is based on the video data supplied from the video data decoding unit 63 and outputs zoom video data acquired as a result thereof to the video output device 53.

Note that, in a case where the selection zoom area information is information indicating no trimming, the video segmenting unit 64 does not perform a trimming process for video data and directly outputs the video data to the video output device 53 as zoom video data.

The audio data decoding unit 65 decodes encoded audio data supplied from the content data decoding unit 61 and supplies audio data acquired as a result thereof to the audio converting unit 66.

The audio converting unit 66, on the basis of the selection zoom area information supplied form the zoom area selecting unit 62, performs an audio converting process for the audio data supplied from the audio data decoding unit 65 and supplies zoom audio data acquired as a result thereof to the audio output device 54.

Here, the audio converting process is a conversion for audio reproduction that is appropriate for zooming the video of the content.

For example, according to the trimming process of a zoom area, in other words, the segmenting process of a zoom area, a distance from an object inside a video up to a watching point that becomes the reference is changed. Thus, for example, in a case where audio data is an object-based audio, the audio converting unit 66 converts positional information of an object as metadata, which is supplied from the content data decoding unit 61 through the audio data decoding unit 65, on the basis of the selection zoom area information. In other words, the audio converting unit 66 moves the position of an object that is a sound source, in other words, a distance up to the object on the basis of the selection zoom area information.

Then, the audio converting unit 66 performs a rendering process on the basis of the audio data in which the position of the object has moved and supplies zoom audio data acquired as a result thereof to the audio output device 54, thereby reproducing the audio.

Note that, for example, such an audio converting process is described in detail in PCT/JP2014/067508 and the like.

In addition, in a case where the selection zoom area information is information indicating no trimming, the audio converting unit 66 does not performs the audio converting process for the audio data and directly outputs the audio data to the audio output device 54 as zoom audio data.

<Description of Reproduction Process>

Subsequently, the operation of the reproduction device 51 will be described.

When encoded content data output from the encoding device 11 is received, the reproduction device 51 performs a reproduction process in which the received encoded content data is decoded, and a content is reproduced. Hereinafter, the reproduction process performed by the reproduction device 51 will be described with reference to a flowchart illustrated in FIG. 21.

In Step S41, the content data decoding unit 61 separates encoded video data, encoded audio data, and encoded metadata from received encoded content data and decodes the encoded metadata.

Then, the content data decoding unit 61 supplies the encoded video data to the video data decoding unit 63 and supplies the encoded audio data to the audio data decoding unit 65. In addition, the content data decoding unit 61 supplies metadata acquired through decoding to each unit of the reproduction device 51 as is necessary.

At this time, the content data decoding unit 61 supplies zoom area information acquired as the metadata to the zoom area selecting unit 62. In addition, in a case where zoom area auxiliary information is stored in the encoded content data as header information of the metadata, the content data decoding unit 61 reads the zoom area auxiliary information and supplies the read zoom area auxiliary information to the zoom area selecting unit 62. For example, as the zoom area auxiliary information, the supplementary information ZoomAreaCommentary[idx], ZoomAreaSpecifiedID[idx] that is the specification ID, and the like described above are read.

In Step S42, the zoom area selecting unit 62 selects one piece of zoom area information from zoom area information supplied from the content data decoding unit 61 and supplies the selection zoom area information according to a result of the selection to the video segmenting unit 64 and the audio converting unit 66.

For example, when the zoom area information is selected, the zoom area selecting unit 62 supplies the zoom area auxiliary information to the display device 52 so as to be displayed thereon and selects zoom area information on the basis of a signal supplied by an operation input from a user who has seen the display.

In addition, as described above, by using not only the zoom area auxiliary information and the operation input from the user but also the reproduction equipment information or the direction information, the zoom area information may be selected.

In Step S43, the video data decoding unit 63 decodes encoded video data supplied from the content data decoding unit 61 and supplies video data acquired as a result thereof to the video segmenting unit 64.

In Step S44, the video segmenting unit 64 segments (trims) a zoom area represented by the selection zoom area information supplied from the zoom area selecting unit 62 for a video that is based on the video data supplied from the video data decoding unit 63. In this way, zoom video data for reproducing a video of the zoom area represented by the selection zoom area information is acquired.

The video segmenting unit 64 supplies the zoom video data acquired through segmentation to the video output device 53, thereby reproducing a video of the trimmed content. The video output device 53 reproduces (displays) a video on the basis of the zoom video data supplied from the video segmenting unit 64.

In Step S45, the audio data decoding unit 65 decodes encoded audio data supplied from the content data decoding unit 61 and supplies audio data acquired as a result thereof to the audio converting unit 66.

In Step S46, the audio converting unit 66, on the basis of the selection zoom area information supplied from the zoom area selecting unit 62, performs an audio converting process for the audio data supplied from the audio data decoding unit 65. In addition, the audio converting unit 66 supplies zoom audio data acquired through the audio converting process to the audio output device 54, thereby outputting an audio. The audio output device 54 reproduces an audio of the content for which the audio converting process has been performed on the basis of the zoom audio data supplied from the audio converting unit 66, and the reproduction process ends.

Note that, more specifically, the process of Steps S43 and S44 and the process of Steps S45 and S46 are performed in parallel with each other.

As above, the reproduction device 51 selects appropriate zoom area information, performs trimming of video data and the audio converting process for the audio data on the basis of the selection zoom area information according to a result of the selection, and reproduces the content.

In this way, by selecting the zoom area information, a content that is appropriately trimmed and has a converted audio such as a content matching user's taste or a content that is appropriate for the size of the display screen of the reproduction device 51, the rotation direction of the reproduction device 51, and the like can be reproduced in a simplified manner. In addition, in a case where the user selects a zoom area on the basis of the zoom area auxiliary information presented by the display device 52, the user can select a desired zoom area in a simplified manner.

Note that, in the reproduction process described with reference to FIG. 21, while a case has been described in which both the trimming of a video configuring a content and the audio converting process of an audio configuring the content are performed on the basis of the selection zoom area information, only one thereof may be performed.

In addition, also in a case where a content is configured by only a video or an audio, the trimming or the audio converting process is performed for such a video or audio, and the video or audio can be reproduced.

For example, also in a case where a content is configured only by an audio, by selecting zoom area information representing an area to be zoomed and changing a distance up to a sound source object or the like in accordance with the selected zoom area information through an audio converting process, reproduction of a content that is appropriate for user's taste, the reproduction equipment, and the like can be realized.

Second Embodiment

<Example of Configuration of Reproduction Device>

Note that, while an example has been described above in which a zoom area is trimmed from a video of a content in accordance with one piece of selection zoom area information by the video segmenting unit 64, it may be configured such that a plurality of zoom areas are selected, and such a plurality of zoom areas are output in a multi-screen arrangement.

Figure 22:
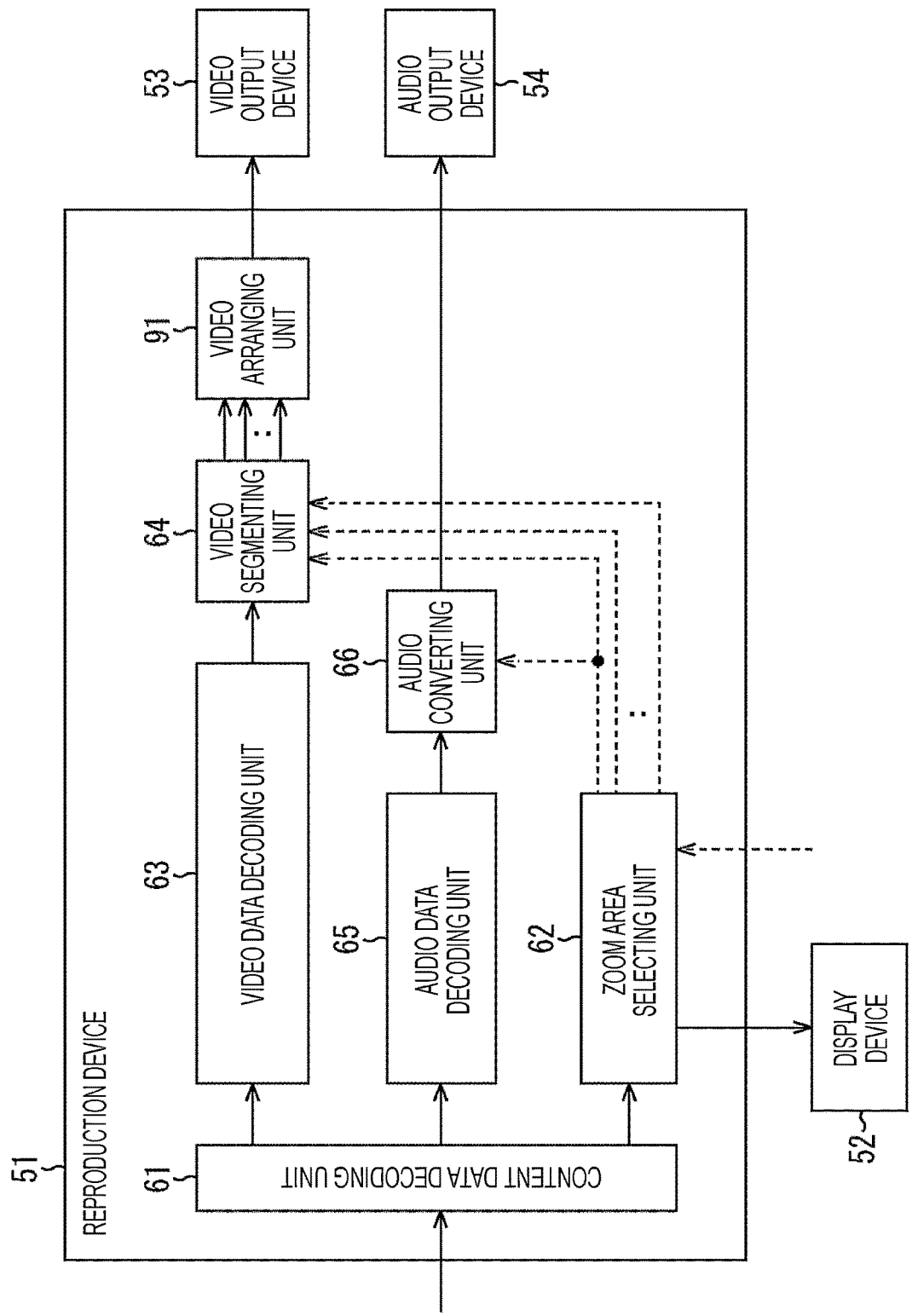
FIG. 22 is a diagram that illustrates an example of the configuration of a reproduction device.

In such a case, a reproduction device 51, for example, is configured as illustrated in FIG. 22. Note that, in FIG. 22, a same reference numeral is assigned to a part corresponding to that of the case illustrated in FIG. 20, and the description thereof will not be presented as is appropriate.

The reproduction device 51 illustrated in FIG. 22 includes: a content data decoding unit 61; a zoom area selecting unit 62; a video data decoding unit 63; a video segmenting unit 64; a video arranging unit 91; an audio data decoding unit 65; and an audio converting unit 66.

The configuration of the reproduction device 51 illustrated in FIG. 22 is different from that of the reproduction device 51 illustrated in FIG. 20 in that the video arranging unit 91 is newly disposed at the rear stage of the video segmenting unit 64 and is the same as the configuration of the reproduction device 51 illustrated in FIG. 20 in the other points.

In this example, the zoom area selecting unit 62 selects one or a plurality of pieces of zoom area information and supplies such zoom area information to the video segmenting unit 64 as selection zoom area information. In addition, the zoom area selecting unit 62 selects one piece of zoom area information and supplies the zoom area information to the audio converting unit 66 as the selection zoom area information.

Note that the selection of the zoom area information performed by the zoom area selecting unit 62, as is the case in the reproduction device 51 illustrated in FIG. 20, may be performed according to user's input operation or be performed on the basis of the zoom area auxiliary information, the reproduction equipment information, the direction information, and the like.

Furthermore, the zoom area information as the selection zoom area information supplied to the audio converting unit 66 may be selected according to user's input operation or be zoom area information arranged at a predetermined position such as a start position of the encoded content data. Other than that, the zoom area information may be zoom area information of a representative zoom area such as a zoom area having a largest size.

The video segmenting unit 64 trims a zoom area represented by each of one or the plurality of pieces of selection zoom area information supplied from the zoom area selecting unit 62 among a video (image) that is based on video data supplied from the video data decoding unit 63, thereby generating zoom video data of each zoom area. In addition, the video segmenting unit 64 supplies the zoom video data of each zoom area acquired through the trimming to the video arranging unit 91.

Note that the video segmenting unit 64 may directly supply video data that has not been trimmed to the video arranging unit 91 as one piece of zoom video data.

The video arranging unit 91, on the basis of one or a plurality of pieces of zoom video data supplied from the video segmenting unit 64, generates a multi-screen video data that is reproduced with a video based on such zoom video data arranged in multiple screens and supplies the generated multi-screen video data to the video output device 53. Here, the video reproduced on the basis of the multi-screen video data, for example, similar to the image Q14 illustrated in FIG. 18, is a video in which videos (images) of the selected zoom areas are arranged to be aligned.

In addition, the audio converting unit 66, on the basis of the selection zoom area information supplied from the zoom area selecting unit 62, performs an audio converting process for audio data supplied from the audio data decoding unit 65 and supplies zoom audio data acquired as a result thereof to an audio output device 54 as audio data of a representative audio of the multi-screen arrangement. In addition, the audio converting unit 66 may directly supply audio data supplied from the audio data decoding unit 65 to the audio output device 54 as the audio data (zoom audio data) of the representative audio.

<Description of Reproduction Process>

Figure 23:
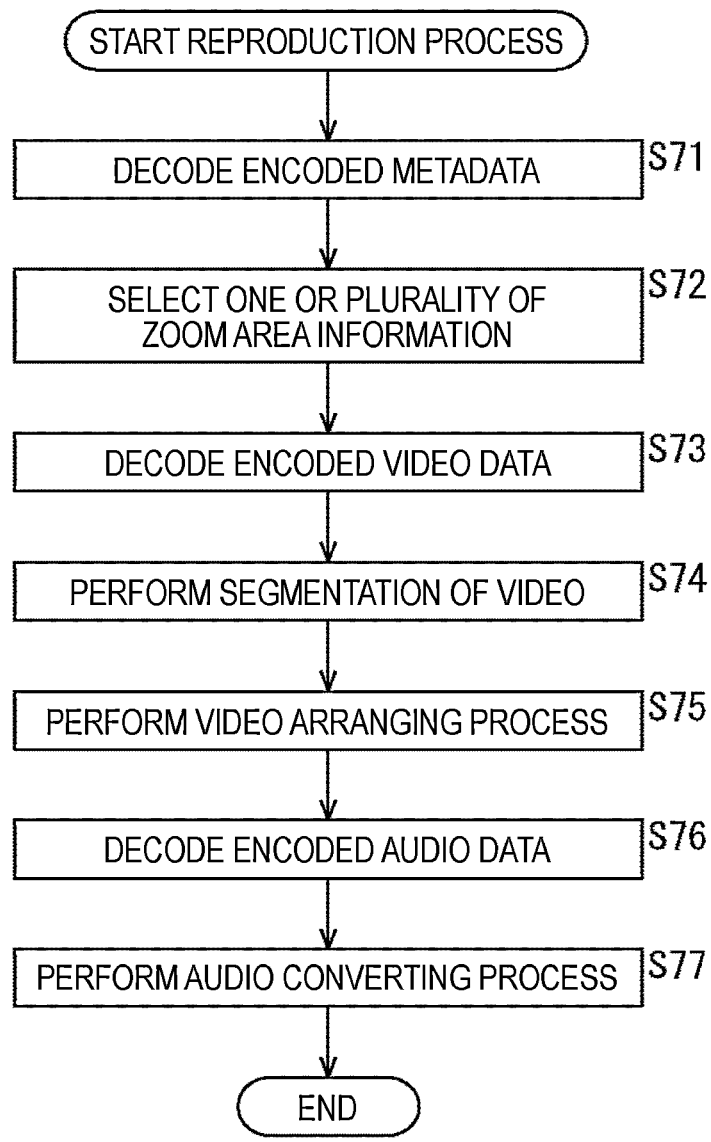
FIG. 23 is a flowchart that illustrates a reproduction process.

Next, a reproduction process performed by the reproduction device 51 illustrated in FIG. 22 will be described with reference to a flowchart illustrated in FIG. 23. Note that the process of Step S71 is similar to the process of Step S41 illustrated in FIG. 21, and the description thereof will not be presented.

In Step S72, the zoom area selecting unit 62 selects one or a plurality of pieces of zoom area information from among zoom area information supplied from the content data decoding unit 61 and supplies selection zoom area information according to a result of the selection to the video segmenting unit 64.

Figure 21:
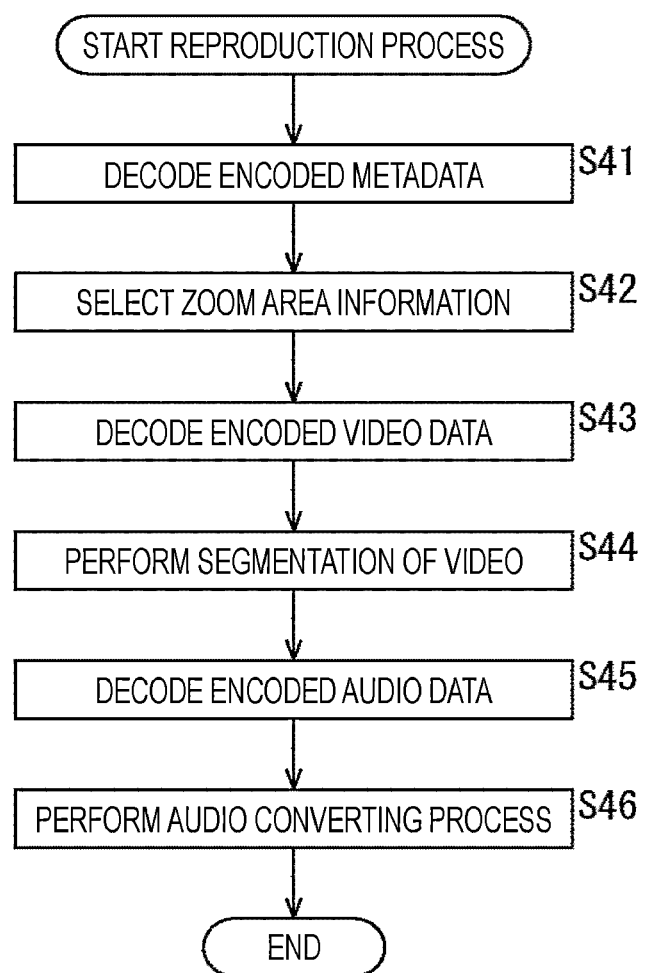
FIG. 21 is a flowchart that illustrates a reproduction process.

Note that the process of selecting the zoom area information described here is basically similar to the process of Step S42 illustrated in FIG. 21 except that the number of selected pieces of zoom area information is different.

In addition, the zoom area selecting unit 62 selects zoom area information of one representative zoom area from among the zoom area information supplied from the content data decoding unit 61 and supplies selection zoom area information according to a result of the selection to the audio converting unit 66. Here, the selection zoom area information supplied to the audio converting unit 66 is the same as one of one or the plurality of pieces of selection zoom area information supplied to the video segmenting unit 64.

When the zoom area information is selected, thereafter, the process of Steps S73 and S74 is performed, and decoding of the encoded video data and trimming of the zoom area from the video are performed. However, such a process is similar to the process of Steps S43 and S44 illustrated in FIG. 21, and the description thereof will not be presented. However, in Step S74, for each of one or a plurality of pieces of selection zoom area information, the trimming (segmenting) of a zoom area represented by the selection zoom area information from a video based on the video data is performed, and zoom video data of each zoom area is supplied to the video arranging unit 91.

In Step S75, the video arranging unit 91 performs a video arranging process on the basis of one or the plurality of pieces of zoom video data supplied from the video segmenting unit 64. In other words, the video arranging unit 91 generates multi-screen video data on the basis of one or a plurality of pieces of zoom video data and supplies the generated multi-screen video data to the video output device 53, thereby reproducing the video of each zoom area of the content. The video output device 53 reproduces (displays) videos arranged in multiple screens on the basis of the multi-screen video data supplied from the video arranging unit 91. For example, in a case where a plurality of pieces of zoom area are selected, the content is reproduced in a multi-screen configuration like the image Q14 illustrated in FIG. 18.

When the video arranging process is performed, thereafter, the process of Steps S76 and S77 is performed, and the reproduction process ends. However, such a process is similar to the process of Steps S45 and S46 illustrated in FIG. 21, and the description thereof will not be presented.

As above, the reproduction device 51 selects one or a plurality of pieces of zoom area information, performs the trimming of the video data and the audio converting process for the audio data on the basis of the selection zoom area information according to a result of the selection, and reproduces the content.

In this way, by selecting one or a plurality of pieces of zoom area information, an appropriate content such as a content matching user's taste or a content appropriate for the size of the display screen of the reproduction device 51 or the like can be reproduced in a simplified manner. Particularly, in a case where a plurality of pieces of zoom area information are selected, a content video can be reproduced in a multi-screen display matching user's taste and the like.

In addition, in a case where the user selects a zoom area on the basis of the zoom area auxiliary information presented by a display device 52, the user can select a desired zoom area in a simplified manner.

Third Embodiment

<Example of Configuration of Reproduction Device>

Figure 24:
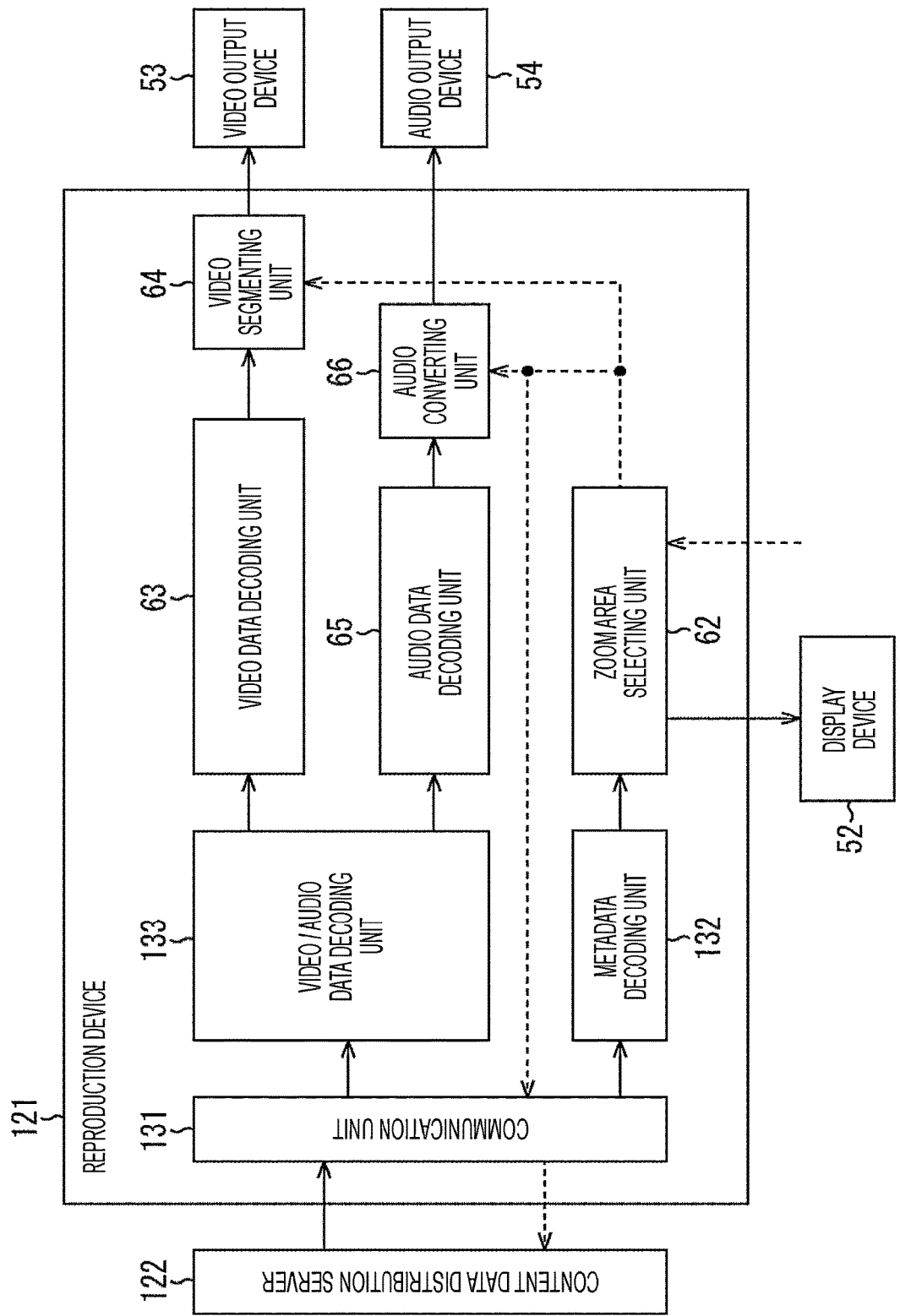
FIG. 24 is a diagram that illustrates an example of the configuration of a reproduction device.

In addition, in a case where the content described above is transmitted through a network, reproduction-side equipment can be configured to efficiently receive only data that is necessary for the reproduction of a selected zoom area. In such a case, for example, a reproduction device is configured as illustrated in FIG. 24. Note that, in FIG. 24, a same reference numeral is assigned to a part corresponding to that of the case illustrated in FIG. 20, and the description thereof will not be presented as is appropriate.

In the case illustrated in FIG. 24, a reproduction device 121 reproducing contents receives supply of desired encoded video data and encoded audio data from a content data distribution server 122 in which contents and metadata are recorded. In other words, the content data distribution server 122 records contents and metadata of the contents in an encoded state or an un-encoded state and distributes contents in response to a request from the reproduction device 121.

In this example, the reproduction device 121 includes: a communication unit 131; a metadata decoding unit 132; a video/audio data decoding unit 133; a zoom area selecting unit 62; a video data decoding unit 63; a video segmenting unit 64; an audio data decoding unit 65; and an audio converting unit 66.

The communication unit 131 transmits/receives various kinds of data to/from the content data distribution server 122 through a network.

For example, the communication unit 131 receives encoded metadata from the content data distribution server 122 and supplies the received encoded metadata to the metadata decoding unit 132 or receives encoded video data and encoded audio data from the content data distribution server 122 and supplies the received data to the video/audio data decoding unit 133. In addition, the communication unit 131 transmits selection zoom area information supplied from the zoom area selecting unit 62 to the content data distribution server 122.

The metadata decoding unit 132 acquires metadata by decoding the encoded metadata supplied from the communication unit 131 and supplies the acquired metadata to each unit of the reproduction device 121 as is necessary.

In addition, in a case where zoom area information is included in the metadata, the metadata decoding unit 132 supplies the zoom area information to the zoom area selecting unit 62. Furthermore, in a case where zoom area auxiliary information is received from the content data distribution server 122, the metadata decoding unit 132 supplies the zoom area auxiliary information to the zoom area selecting unit 62.

When the encoded video data and the encoded audio data are supplied from the communication unit 131, the video/audio data decoding unit 133 supplies the encoded video data to the video data decoding unit 63 and supplies the encoded audio data to the audio data decoding unit 65.

<Description of Reproduction Process>

Subsequently, the operation of the reproduction device 121 will be described.

Figure 25:
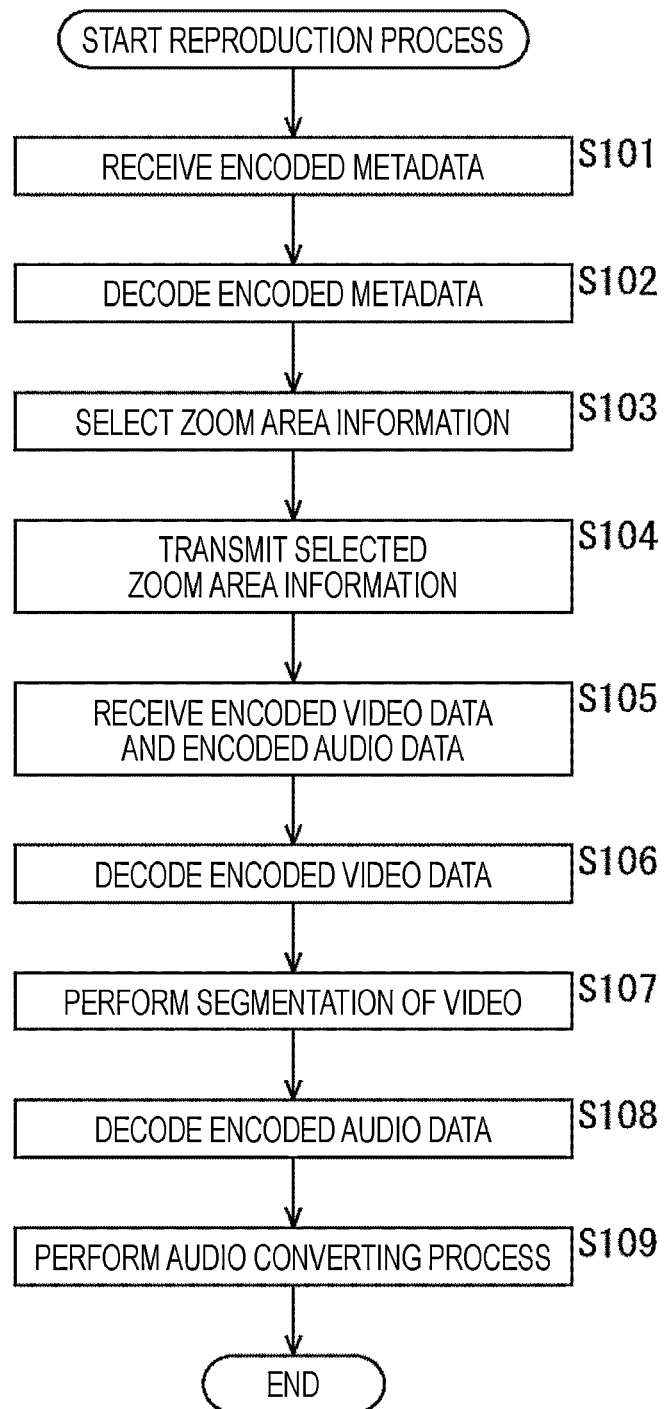
FIG. 25 is a flowchart that illustrates a reproduction process.

The reproduction device 121 requests the content data distribution server 122 to transmit encoded metadata. Then, when the encoded metadata is transmitted from the content data distribution server 122, the reproduction device 121 reproduces a content by performing a reproduction process. Hereinafter, the reproduction process performed by the reproduction device 121 will be described with reference to a flowchart illustrated in FIG. 25.

In Step S101, the communication unit 131 receives encoded metadata transmitted from the content data distribution server 122 and supplies the received metadata to the metadata decoding unit 132. Note that, more specifically, the communication unit 131, as is necessary, also receives header information of the metadata such as the zoom area number information and the zoom area auxiliary information from the content data distribution server 122 and supplies the received header information to the metadata decoding unit 132.

In Step S102, the metadata decoding unit 132 decodes the encoded metadata supplied from the communication unit 131 and supplies metadata acquired through the decoding to each unit of the reproduction device 121 as is necessary. In addition, the metadata decoding unit 132 supplies zoom area information acquired as the metadata to the zoom area selecting unit 62 and, in a case where zoom area auxiliary information is present as the header information of the metadata, supplies also the zoom area auxiliary information to the zoom area selecting unit 62.

In this way, in a case where the metadata is acquired, subsequently, zoom area information is selected by performing the process of Step S103. However, the process of Step S103 is similar to the process of Step S42 illustrated in FIG. 21, and the description thereof will not be presented. However, in Step S103, selection zoom area information acquired by selecting zoom area information is supplied to the video segmenting unit 64, the audio converting unit 66, and the communication unit 131.

In Step S104, the communication unit 131 transmits the selection zoom area information supplied from the zoom area selecting unit 62 to the content data distribution server 122 through a network.

The content data distribution server 122 that has received the selection zoom area information performs trimming (segmenting) of a zoom area represented by the selection zoom area information for the video data of the recorded content, thereby generating zoom video data. The zoom video data acquired in this way is video data reproducing only the zoom area represented by the selection zoom area information among the whole video of the original content.

The content data distribution server 122 transmits encoded video data acquired by encoding the zoom video data and encoded audio data acquired by encoding audio data configuring the content to the reproduction device 121.

Note that, in the content data distribution server 122, the zoom video data of each zoom area may be prepared in advance. In addition, in the content data distribution server 122, regarding audio data configuring a content, while, generally, all the audio data is encoded, and the encoded audio data is output regardless of the selected zoom area, only encoded audio data of a part of the audio data may be configured to be output. For example, in a case where audio data configuring a content is audio data of each object, only the audio data of objects within a zoom area represented by the selection zoom area information may be encoded and be transmitted to the reproduction device 121.

In Step S105, the communication unit 131 receives the encoded video data and the encoded audio data transmitted from the content data distribution server 122 and supplies the encoded video data and the encoded audio data to the video/audio data decoding unit 133. In addition, the video/audio data decoding unit 133 supplies the encoded video data supplied from the communication unit 131 to the video data decoding unit 63 and supplies the encoded audio data supplied from the communication unit 131 to the audio data decoding unit 65.

When the encoded video data and the encoded audio data are acquired, thereafter, the process of Steps S106 to S109 is performed, and the reproduction process ends. However, such a process is similar to the process of Steps S43 to S46 illustrated in FIG. 21, and thus, the description thereof will not be presented.

However, since a signal acquired by the video data decoding unit 63 decoding the encoded video data is zoom video data that has already been trimmed, basically, the trimming process is not performed by the video segmenting unit 64. Only in a case where trimming is additionally necessary, the video segmenting unit 64 performs trimming of the zoom video data supplied from the video data decoding unit 63 on the basis of the selection zoom area information supplied from the zoom area selecting unit 62.

In this way, when the content is reproduced by a video output device 53 and an audio output device 54 on the basis of the zoom video data and the zoom audio data, a content according to the selected zoom area, for example, as illustrated in FIG. 18, is reproduced.

As above, the reproduction device 121 selects appropriate zoom area information, transmits selection zoom area information according to a result of the selection to the content data distribution server 122, and receives encoded video data and encoded audio data.

In this way, by receiving the encoded video data and the encoded audio data in accordance with the selection zoom area information, an appropriate content such as a content matching user's taste or a content that is appropriate for the size of the display screen of the reproduction device 121, the rotation direction of the reproduction device 121, and the like can be reproduced in a simplified manner. In addition, only data that is necessary for the reproduction of the content can be efficiently acquired.

Fourth Embodiment

<Example of Configuration of Reproduction Device>

In addition, an example has been described above in which the zoom area information is included in the encoded content data. However, for example, separately from the content, the content may be trimmed and reproduced according to zoom area information that is open on a network such as the Internet or zoom area information recorded on a predetermined recording medium. In such a case, for example, the trimming reproduction can be performed by acquiring zoom area information produced not only by the content producer but also a third party other than the content producer, in other words, other users.

Figure 26:
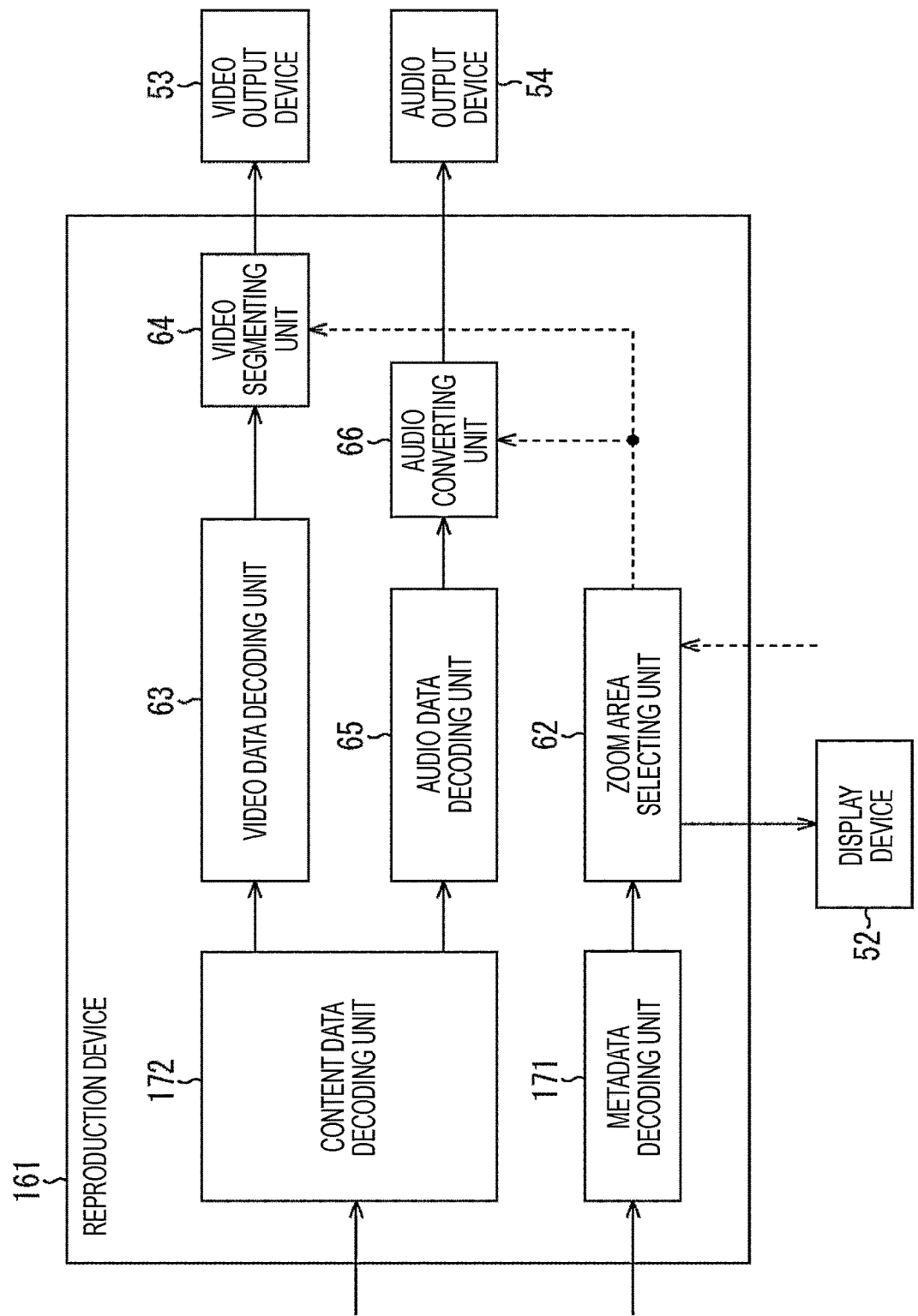
FIG. 26 is a diagram that illustrates an example of the configuration of a reproduction device.

In this way, in a case where a content and metadata including zoom area information are separately acquired, a reproduction device, for example, is configured as illustrated in FIG. 26. Note that, in FIG. 26, a same reference numeral is assigned to a part corresponding to that of the case illustrated in FIG. 20, and the description thereof will not be present as is appropriate.

A reproduction device 161 illustrated in FIG. 26 includes: a metadata decoding unit 171; a content data decoding unit 172; a zoom area selecting unit 62; a video data decoding unit 63; a video segmenting unit 64; an audio data decoding unit 65; and an audio converting unit 66.

The metadata decoding unit 171 acquires encoded metadata of metadata including zoom area information, for example, from a device on a network, a recording medium connected to the reproduction device 161, or the like and decodes the acquired encoded metadata.

In addition, the metadata decoding unit 171 supplies metadata acquired by decoding the encoded metadata to each unit of the reproduction device 161 as is necessary and supplies the zoom area information included in the metadata to the zoom area selecting unit 62. Furthermore, the metadata decoding unit 171 acquires header information of the metadata such as zoom area auxiliary information together with the encoded metadata as is necessary and supplies the acquired header information to the zoom area selecting unit 62.

The content data decoding unit 172 acquires encoded video data and encoded audio data of a content, for example, from a device on a network, a recording medium connected to the reproduction device 161, or the like. In addition, the content data decoding unit 172 supplies the acquired encoded video data to the video data decoding unit 63 and supplies the acquired encoded audio data to the audio data decoding unit 65. Note that, in this example, the encoded video data and the encoded audio data and the encoded metadata are acquired from mutually-different devices, recording media, or the like.

<Description of Reproduction Process>

Subsequently, the operation of the reproduction device 161 will be described.

Figure 27:
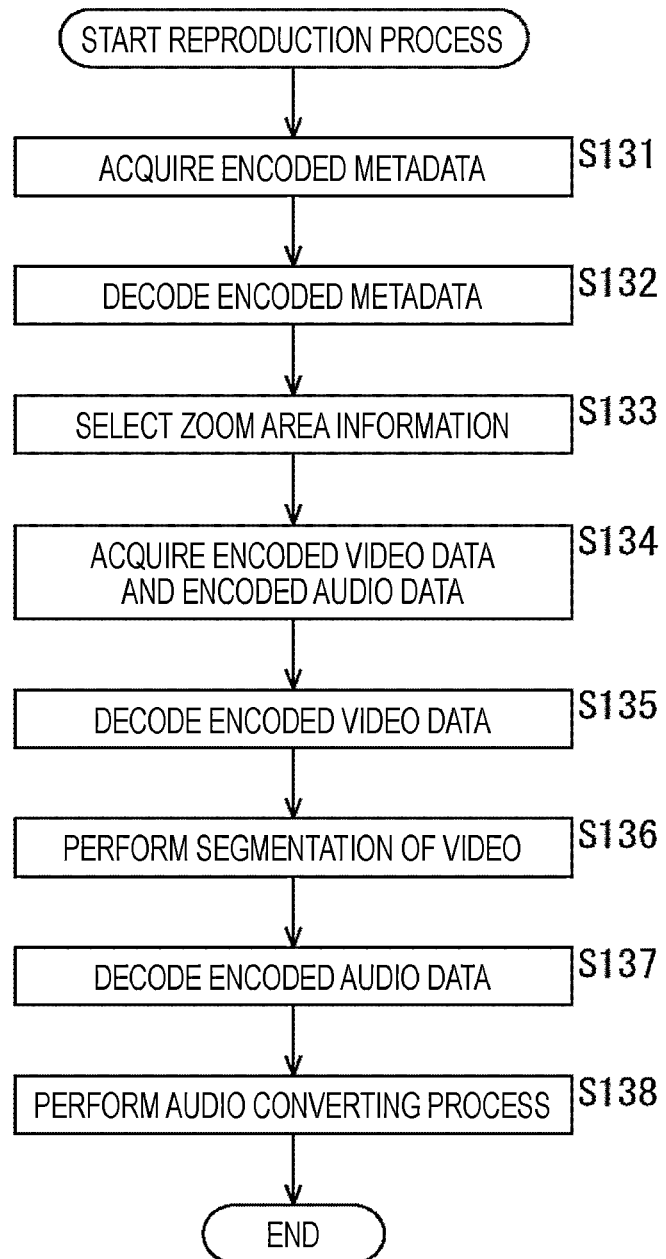
FIG. 27 is a flowchart that illustrates a reproduction process.

When reproduction of a content is directed, the reproduction device 161 performs a reproduction process in which encoded metadata and encoded content are acquired, and the content is reproduced. Hereinafter, the reproduction process performed by the reproduction device 161 will be described with reference to a flowchart illustrated in FIG. 27.

In Step S131, the metadata decoding unit 171 acquires encoded metadata including zoom area information for example, from a device on a network, a recording medium connected to the reproduction device 161, or the like. Note that the encoded metadata may be acquired in advance before the start of the reproduction process.

In Step S132, the metadata decoding unit 171 decodes the acquired encoded metadata and supplies metadata acquired as a result thereof to each unit of the reproduction device 161 as is necessary. In addition, the metadata decoding unit 171 supplies zoom area information included in the metadata to the zoom area selecting unit 62 and also supplies header information of the metadata such as zoom area auxiliary information acquired as is necessary to the zoom area selecting unit 62.

When the metadata is acquired through decoding, the process of Step S133 is performed, and zoom area information is selected. However, the process of Step S133 is similar to the process of Step S42 illustrated in FIG. 21, and the description thereof will not be presented.

In Step S134, the content data decoding unit 172 acquires encoded video data and encoded audio data of a content, for example, from a device on a network, a recording medium connected to the reproduction device 161 or the like. In addition, the content data decoding unit 172 supplies the acquired encoded video data to the video data decoding unit 63 and supplies the acquired encoded audio data to the audio data decoding unit 65.

In this way, when the encoded video data and the encoded audio data of the content are acquired, thereafter, the process of Steps S135 to S138 is performed, and the reproduction process ends. However, such a process is similar to the process of Steps S43 to S46 illustrated in FIG. 21, and the description thereof will not be presented.

As above, the reproduction device 161 separately acquires the encoded video data and the encoded audio data of a content and encoded metadata including zoom area information. Then, the reproduction device 161 selects appropriate zoom area information and performs trimming of video data and the audio converting process of audio data on the basis of the selection zoom area information according to a result of the selection, and reproduces the content.

In this way, by separately acquiring the encoded metadata including the zoom area information from the encoded video data and the encoded audio data, various zoom areas such as zoom areas set not only by a content producer but also by another user and the like can be trimmed and reproduced.

Meanwhile, a series of the processes described above can be performed either by hardware or by software. In a case where the series of the processes is performed by software, a program configuring the software is installed to a computer. Here, the computer includes a computer built in dedicated hardware, for example, a general-purpose personal computer capable of executing various functions by installing various programs thereto, and the like.

Figure 28:
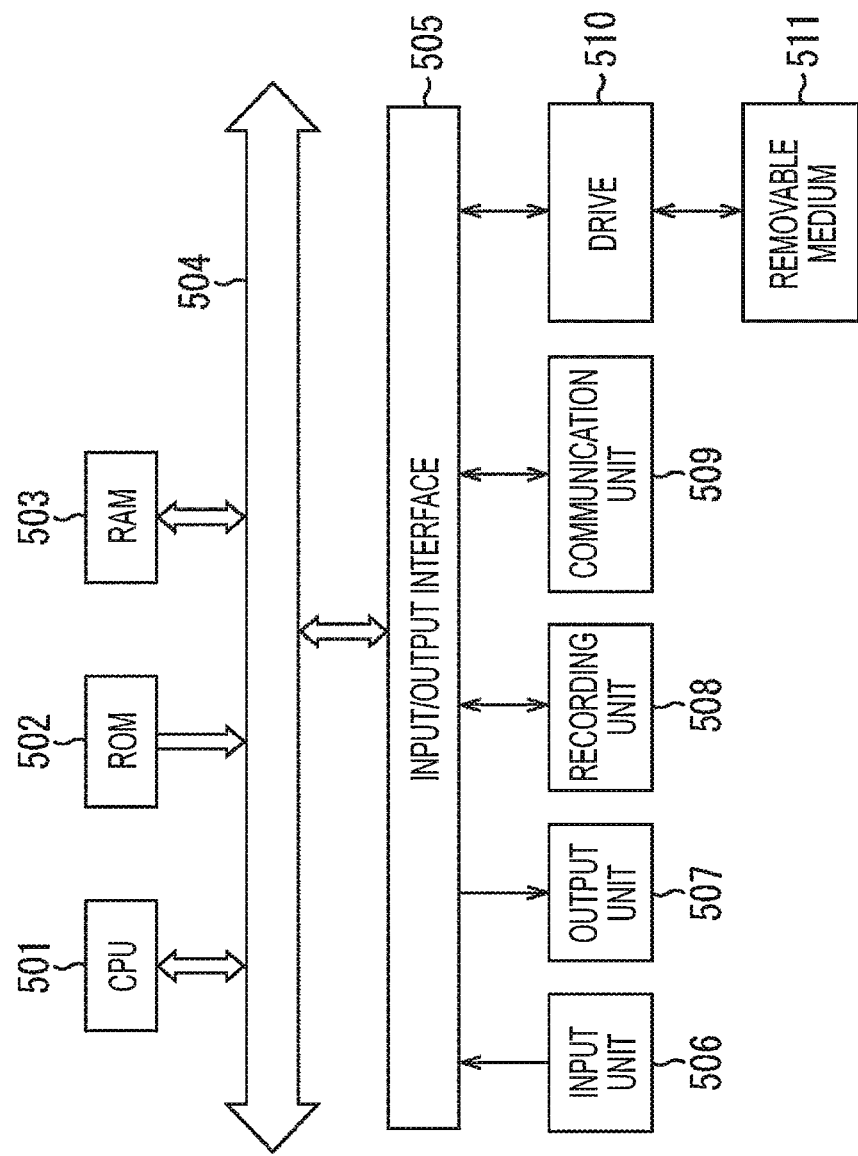
FIG. 28 is a diagram that illustrates an example of the configuration of a computer.

FIG. 28 is a block diagram that illustrates an example of the hardware configuration of a computer that executes the series of processes described above by using a program.

In the computer, a central processing unit (CPU) 501, a read only memory (ROM) 502, and a random access memory (RAM) 503 are interconnected through a bus 504.

In addition, an input/output interface 505 is connected to the bus 504. An input unit 506, an output unit 507, a recording unit 508, a communication unit 509, and a drive 510 are connected to the input/output interface 505.

The input unit 506 is configured by a keyboard, a mouse, a microphone, an imaging device or the like. The output unit 507 is configured by a display, a speaker, and the like. The recording unit 508 is configured by a hard disk, a non-volatile memory, and the like. The communication unit 509 is configured by a network interface or the like. The drive 510 drives a removable medium 511 such as a magnetic disk, an optical disc, a magneto-optical disk, or a semiconductor memory.

In the computer configured as above, the CPU 501, for example, loads a program recorded in the recording unit 508 into the RAM 503 through the input/output interface 505 and the bus 504 and executes the loaded program, thereby executing the series of the processes described above.

The program executed by the computer (the CPU 501), for example, may be provided with being recorded on the removable medium 511 as a package medium or the like. In addition, the program may be provided through a wired or wireless transmission medium such as a local area network, the Internet, or digital satellite broadcast.

In the computer, by loading the removable medium 511 into the drive 510, the program can be installed to the recording unit 508 through the input/output interface 505. In addition, the program may be received by the communication unit 509 through a wired or wireless transmission medium and be installed to the recording unit 508. Furthermore, the program may be installed to the ROM 502 or the recording unit 508 in advance.

Note that the program executed by the computer may be a program executing the process in a time series in accordance with the sequence described in this specification or a program executing the process in a parallel manner or at necessary timing such as at the time of being called.

In addition, embodiments of the present technology are not limited to the embodiments described above, and various changes can be made therein in a range not departing from the concept of the present technology.

For example, the present technology may employ a configuration of cloud computing in which one function is shared by a plurality of devices through a network and is processed together by all the devices.

In addition, each step described in the flowchart described above may be performed not only by one device but also by a plurality of devices in a shared manner.

Furthermore, in a case where a plurality of processes are included in one step, the plurality of processes included in the one step may be performed not only by one device but also by a plurality of devices in a shared manner.

In addition, the present technology may employ the following configurations.

[1]
A reproduction device including:
a decoding unit that decodes encoded video data or encoded audio data;
a zoom area selecting unit that selects one or a plurality of pieces of zoom area information from among a plurality of pieces of zoom area information designating areas to be zoomed; and
a data processing unit that performs a trimming process for the video data acquired through decoding or an audio converting process for the audio data acquired through decoding on the basis of the selected zoom area information.

[2]
The reproduction device according to [1], wherein, in the plurality of pieces of zoom area information, the zoom area information designating the area for each type of reproduction target equipment is included.

[3]
The reproduction device according to [1] or [2], wherein, in the plurality of pieces of zoom area information, the zoom area information designating the area for each rotation direction of reproduction target equipment is included.

[4]
The reproduction device according to any one of [1] to [3], wherein, in the plurality of pieces of zoom area information, the zoom area information designating the area for each specific video object is included.

[5]
The reproduction device according to any one of [1] to [4], wherein the zoom area selecting unit selects the zoom area information in accordance with user's operation input.

[6]
The reproduction device according to any one of [1] to [4], wherein the zoom area selecting unit selects the zoom area information on the basis of information relating to the reproduction device.

[7]
The reproduction device according to [6], wherein the zoom area selecting unit selects the zoom area information by using at least any one of information representing a type of the reproduction device and information representing a rotation direction of the reproduction device as the information relating to the reproduction device.

[8]
A reproduction method including steps of:
decoding encoded video data or encoded audio data;
selecting one or a plurality of pieces of zoom area information from among a plurality of pieces of zoom area information designating areas to be zoomed; and
performing a trimming process for the video data acquired through decoding or an audio converting process for the audio data acquired through decoding on the basis of the selected zoom area information.

[9]
A program causing a computer to perform a process including steps of:
decoding encoded video data or encoded audio data;
selecting one or a plurality of pieces of zoom area information from among a plurality of pieces of zoom area information designating areas to be zoomed; and
performing a trimming process for the video data acquired through decoding or an audio converting process for the audio data acquired through decoding on the basis of the selected zoom area information.

[10]
An encoding device including:
an encoding unit that encodes video data or encodes audio data; and
a multiplexer that generates a bit stream by multiplexing the encoded video data or the encoded audio data and a plurality of pieces of zoom area information designating areas to be zoomed.

[11]
An encoding method including steps of:
encoding video data or encoding audio data; and
generating a bit stream by multiplexing the encoded video data or the encoded audio data and a plurality of pieces of zoom area information designating areas to be zoomed.

[12]
A program causing a computer to perform a process including steps of:
encoding video data or encoding audio data; and
generating a bit stream by multiplexing the encoded video data or the encoded audio data and a plurality of pieces of zoom area information designating areas to be zoomed.

REFERENCE SIGNS LIST

11 Encoding device
21 Video data encoding unit
22 Audio data encoding unit
23 Metadata encoding unit
24 Multiplexer
25 Output unit
51 Reproduction device
61 Content data decoding unit
62 Zoom area selecting unit
63 Video data decoding unit
64 Video segmenting unit
65 Audio data decoding unit
66 Audio converting unit

The invention claimed is:

1. A reproduction device comprising:
processing circuitry configured to:
receive a bit stream including encoded video data or encoded audio data and a plurality of pieces of zoom area information;
decode the encoded video data or the encoded audio data;
select at least one piece of zoom area information from among the plurality of pieces of zoom area information, wherein selecting the at least one piece of zoom area information is based on reproduction equipment information that indicates a type of the reproduction device; and
perform a trimming process for the video data acquired through decoding or an audio converting process for the audio data acquired through decoding on the basis of the selected zoom area information.

2. The reproduction device according to claim 1, wherein, in the plurality of pieces of zoom area information, the zoom area information designating the area for each type of reproduction target equipment is included.

3. The reproduction device according to claim 1, wherein, in the plurality of pieces of zoom area information, the zoom area information designating the area for each rotation direction of reproduction target equipment is included.

4. The reproduction device according to claim 1, wherein, in the plurality of pieces of zoom area information, the zoom area information designating the area for each specific video object is included.

5. The reproduction device according to claim 1, wherein the processing circuitry is configured to select the zoom area information in accordance with user's operation input.

6. The reproduction device according to claim 1, wherein the processing circuitry is configured to select the zoom area information on the basis of information relating to the reproduction device.

7. The reproduction device according to claim 6, wherein the processing circuitry is configured to select the zoom area information by using information representing a rotation direction of the reproduction device as the information relating to the reproduction device.

8. A reproduction method executed by a reproduction device including processing circuitry, the method comprising:
receiving a bit stream including encoded video data or encoded audio data and a plurality of pieces of zoom area information;
decoding the encoded video data or the encoded audio data;
selecting at least one piece of zoom area information from among a plurality of pieces of zoom area information, wherein selecting the at least one piece of zoom area information is based on reproduction equipment information that indicates a type of the reproduction device; and
performing a trimming process for the video data acquired through decoding or an audio converting process for the audio data acquired through decoding on the basis of the selected zoom area information.

9. A non-transitory computer readable medium containing instructions that, when executed by a reproduction device including processing circuitry, perform a reproduction method comprising:
receiving a bit stream including encoded video data or encoded audio data and a plurality of pieces of zoom area information;
decoding the encoded video data or the encoded audio data;
selecting at least one piece of zoom area information from among a plurality of pieces of zoom area information, wherein selecting the at least one piece of zoom area information is based on reproduction equipment information that indicates a type of the reproduction device; and
performing a trimming process for the video data acquired through decoding or an audio converting process for the audio data acquired through decoding on the basis of the selected zoom area information.

* * * * *